(12) United States Patent
Abdel-Aziz et al.

(10) Patent No.: US 7,849,140 B2
(45) Date of Patent: Dec. 7, 2010

(54) PEER-TO-PEER EMAIL MESSAGING

(75) Inventors: Mohamed M. Abdel-Aziz, Santa Clara, CA (US); Bernard A. Traversat, San Francisco, CA (US); Matthew Reid, Fremont, CA (US); Ingrid VanDenHoogen, Los Gatos, CA (US); William N. Joy, Aspen, CO (US); Michael J. Clary, Monte Sereno, CA (US)

(73) Assignee: Oracle America, Inc., Redwood City, CA (US)

( * ) Notice: Subject to any disclaimer, the term of this patent is extended or adjusted under 35 U.S.C. 154(b) by 2781 days.

(21) Appl. No.: 10/231,225

(22) Filed: Aug. 29, 2002

(65) Prior Publication Data

US 2004/0064511 A1    Apr. 1, 2004

(51) Int. Cl.
*G06F 15/16* (2006.01)

(52) U.S. Cl. .................. 709/206; 709/201; 709/236; 709/246

(58) Field of Classification Search .................. 709/201, 709/228, 229, 230, 212, 213, 203, 219, 238, 709/246, 204, 236
See application file for complete search history.

(56) References Cited

U.S. PATENT DOCUMENTS

| | | | |
|---|---|---|---|
| 5,109,483 A | 4/1992 | Baratz et al. | |
| 5,224,205 A | 6/1993 | Dinkin et al. | |
| 5,442,637 A | 8/1995 | Nguyen | |
| 5,517,622 A | 5/1996 | Ivanoff et al. | |
| 5,675,629 A | 10/1997 | Raffel et al. | |
| 5,675,782 A | 10/1997 | Montague et al. | |
| 5,719,861 A | 2/1998 | Okanoue | |
| 5,729,682 A | 3/1998 | Marquis et al. | |
| 5,758,087 A | 5/1998 | Aaker et al. | |

(Continued)

FOREIGN PATENT DOCUMENTS

EP    993 163    4/2000

(Continued)

OTHER PUBLICATIONS

How Internet Works, by Preston Gralla, Sixth Edition, chapter 16, pp. 89.*

(Continued)

*Primary Examiner*—John Follansbee
*Assistant Examiner*—Kamal B Divecha
(74) *Attorney, Agent, or Firm*—Robert C. Kowert; Meyertons, Hood, Kivlin, Kowert & Goetzel, P.C.

(57) ABSTRACT

System and method for facilitating communications between peers in a peer-to-peer environment and network email clients. In one embodiment, network nodes including peer nodes may host mail transfer agents. The mail transfer agents may act as bridges between peer-to-peer protocols and email communication protocols. The mail transfer agents may communicate with peers according to peer-to-peer protocols and with email clients according to email communications protocols. Peers may communicate with mail transfer agents to send peer-to-peer messages to email clients. Email clients may communicate with the mail transfer agents to send email messages to and receive email messages from other email clients via the peer-to-peer network and to obtain peer-to-peer messages from peers.

58 Claims, 11 Drawing Sheets

U.S. PATENT DOCUMENTS

| | | | |
|---|---|---|---|
| 5,768,527 A | 6/1998 | Zhu et al. | |
| 5,805,298 A * | 9/1998 | Ho et al. | 358/402 |
| 5,805,820 A | 9/1998 | Bellovin et al. | |
| 5,896,503 A | 4/1999 | Badovinatz et al. | |
| 5,931,916 A | 8/1999 | Barker et al. | |
| 5,941,988 A | 8/1999 | Bhagwat et al. | |
| 5,961,590 A * | 10/1999 | Mendez et al. | 709/206 |
| 5,987,504 A * | 11/1999 | Toga | 709/206 |
| 5,999,530 A | 12/1999 | LeMaire et al. | |
| 6,061,734 A | 5/2000 | London | |
| 6,105,064 A | 8/2000 | Davis et al. | |
| 6,141,695 A * | 10/2000 | Sekiguchi et al. | 709/246 |
| 6,182,136 B1 | 1/2001 | Ramanathan et al. | |
| 6,212,558 B1 | 4/2001 | Antur et al. | |
| 6,269,099 B1 * | 7/2001 | Borella et al. | 370/389 |
| 6,324,580 B1 | 11/2001 | Jindal et al. | |
| 6,408,341 B1 | 6/2002 | Feeney et al. | |
| 6,456,600 B1 | 9/2002 | Rochberger et al. | |
| 6,477,590 B1 | 11/2002 | Habusha et al. | |
| 6,591,310 B1 | 7/2003 | Johnson | |
| 6,671,746 B1 | 12/2003 | Northrup | |
| 6,721,286 B1 | 4/2004 | Williams et al. | |
| 6,732,180 B1 | 5/2004 | Hale et al. | |
| 6,757,711 B2 * | 6/2004 | Toga | 709/203 |
| 6,778,491 B1 | 8/2004 | Fourcand et al. | |
| 6,782,527 B1 | 8/2004 | Kouznetsov et al. | |
| 6,792,082 B1 * | 9/2004 | Levine | 379/67.1 |
| 6,795,917 B1 | 9/2004 | Yionen | |
| 6,810,259 B1 | 10/2004 | Zhang | |
| 6,816,461 B1 | 11/2004 | Scrandis et al. | |
| 6,826,763 B1 | 11/2004 | Wang et al. | |
| 6,865,600 B1 | 3/2005 | Brydon et al. | |
| 6,898,422 B2 * | 5/2005 | Bern et al. | 455/412.1 |
| 2001/0042100 A1 * | 11/2001 | Guedalia et al. | 709/206 |
| 2002/0009986 A1 * | 1/2002 | Bern et al. | 455/412 |
| 2002/0062375 A1 | 5/2002 | Teodosiu et al. | |
| 2002/0073075 A1 | 6/2002 | Dutta et al. | |
| 2002/0073204 A1 * | 6/2002 | Dutta et al. | 709/227 |
| 2002/0087704 A1 * | 7/2002 | Chesnais et al. | 709/228 |
| 2002/0112014 A1 * | 8/2002 | Bennett et al. | 709/206 |
| 2002/0152220 A1 * | 10/2002 | Kang et al. | 707/101 |
| 2002/0161821 A1 | 10/2002 | Narayan et al. | |
| 2003/0016639 A1 * | 1/2003 | Kransmo et al. | 370/335 |
| 2003/0067912 A1 * | 4/2003 | Mead et al. | 370/389 |
| 2003/0104827 A1 * | 6/2003 | Moran et al. | 455/466 |
| 2003/0105812 A1 * | 6/2003 | Flowers et al. | 709/203 |
| 2003/0204568 A1 * | 10/2003 | Bhargava et al. | 709/206 |
| 2004/0003133 A1 * | 1/2004 | Pradhan et al. | 709/318 |
| 2004/0068477 A1 | 4/2004 | Gilmour et al. | |
| 2005/0053093 A1 | 3/2005 | Fukushima et al. | |

FOREIGN PATENT DOCUMENTS

EP 022 876 7/2000

OTHER PUBLICATIONS

Microsoft Computer Dictionary, Fifth Edition, pp. 191, 575.*
Ratnasamy, et al., "A Scalable Content-Addressable Network," SIGCOMM'01, San Diego, CA, Aug. 27-31, 2001, pp. 161-172.
Stoica, et al., "Chord: A Scalable Peer-to-Peer Lookup Service for Internet Applications," SIGCOMM'01, San Diego, CA, Aug. 27-31, 2001, pp. 1-12.
Kalt, C., "RFC 2812 Internet Relay Chat: Client Protocol," Request for Comments, Apr. 2000, pp. 1-63, XP002242624.
Marmor, M.S., "Make the P2P Leap with Toadnode," Web Technologies, Miller Freeman, US, vol. 5, No. 12, Dec. 2000, pp. 44-49, XP008000376, ISSN: 1086-556X, *Section "How the Gnutella Protocol Works," on pp. 46-46*.
Krikorian, R., "Hello JXTA," The O'Reilly Network, Online!, Apr. 25, 2001, pp. 1-9, XP002249288.
DRSCHOLL@USERS.SOURCEFORGE.NET: "Napster Messages," Open Source Napster Server, 'Online!, Apr. 7, 2000, pp. 1-25, XP002249287.

* cited by examiner

PEER-TO-PEER EMAIL MESSAGING

BACKGROUND OF THE INVENTION

1. Field of the Invention

This invention relates to peer-to-peer network computing and email systems, and more particularly to facilitating email messaging between email clients and peers participating in a peer-to-peer environment.

2. Description of the Related Art

Peer-to-peer (P2P) computing, embodied by applications like Napster, Gnutella, and Freenet, has offered a compelling and intuitive way for Internet users to find and share resources directly with each other, often without requiring a central authority or server. The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. Apart from improving the performance of information discovery, content delivery, and information processing, such a style also can enhance the overall reliability and fault-tolerance of computing systems. FIG. 1A illustrates two peer devices 104A and 104B that are currently connected. Either of the two peer devices 104 may serve as a client of or a server to the other device. FIG. 1B illustrates several peer devices 104 connected over the network 106 in a peer group. In the peer group, any of the peer devices 104 may serve as a client of or a server to any of the other devices.

Typical email systems rely on client-server environment. For example, an email user may have an account on a typical incoming email server (e.g. a POP3 server or an IMAP server) to receive email messages from other email users. The typical email server may include an email box for storing email messages. The email user may access the email box on the email server over a network using an email client. If the email server is not available, the email user may not have access to incoming email messages.

As another example, an email user may have an account on a typical outgoing email server (e.g. an SMTP server) to send email messages to other email users. An email user may compose an email message and upload the email message to the outgoing email server using an email client over a network. The outgoing email server may send the message over the network to an incoming email server. If either the outgoing email server or the incoming email server is unavailable, the email message may not reach an intended destination.

SUMMARY OF THE INVENTION

A system and method for facilitating communications between peers in a peer-to-peer environment and network email clients are described. In one embodiment, a mail transfer agent may route email messages composed with email clients to peers in the peer-to-peer environment. In one embodiment, the peers may participate in the peer-to-peer environment according to a peer-to-peer platform as described herein. The peers may communicate by sending messages according to one or more of the peer-to-peer platform protocols. One or more of the peers may be coupled to an email client. One or more of the peers may each host an implementation of a mail transfer agent to exchange email messages composed with the email clients with other peers using the peer-to-peer protocols. In one embodiment, the mail transfer agent may be a peer-to-peer network service configured to communicate with email clients using one or more email communications protocols. In one embodiment, the mail transfer agent may be configured to communicate with peers in a peer-to-peer environment using peer-to-peer protocols. In one embodiment, the mail transfer agents may communicate with peers over communications pipes such as those described herein for an exemplary peer-to-peer-platform.

In one embodiment, an email client may be used to compose and send an email message to a peer. The email message may be formatted according to an email message protocol. The email client may use an email communication protocol to send the email message to a mail transfer agent. The mail transfer agent may receive the email message from the email client. The email message may include a destination address indicating a destination of the email message. The mail transfer agent may determine a destination peer corresponding to the destination address. In one embodiment, the mail transfer agent may use a peer discovery protocol to determine the destination peer. In one embodiment, email addresses may be advertised in the peer-to-peer environment using a peer discovery protocol of the peer-to-peer platform.

The mail transfer agent may discover a published advertisement for the destination peer using the destination address. The mail transfer agent may access information describing the destination peer from the peer advertisement and may use the information in forwarding the message to the destination peer. In one embodiment, the peer advertisement may include a pipe endpoint at which the destination peer may receive messages from mail transfer agents. In one embodiment, the mail transfer agent may bind an output pipe of the peer hosting the mail transfer agent to an input pipe of the destination peer. A pipe may represent a virtual communication channel for peer-to-peer communications with one or more of the peers on the network. The mail transfer agent may bind to the pipe using a pipe binding protocol of the peer-to-peer platform.

The mail transfer agent may package the email message for transport over the pipe as a peer-to-peer message. In one embodiment, to package the email message, the mail transfer agent may generate a wrapper in accordance with one of the peer-to-peer platform protocols and wrap the email message with the wrapper. The mail transfer agent may send the peer-to-peer message including the email messages over the pipe to the destination peer. In one embodiment, the destination peer may store the received peer-to-peer message.

In one embodiment, email clients may request messages from mail transfer agents. For example, an email client may access a mail transfer agent using an email communication protocol to request available email messages, if any. In one embodiment, the email client may send one or more commands, including a command that identifies a destination address for which the email messages are being requested, to the mail transfer agent in accordance with the email communication protocol. In one embodiment, the mail transfer agent may include one or more inboxes for storing available email messages, one of which may correspond to the destination address.

The mail transfer agent may retrieve available messages from the inbox corresponding to the destination address in response to the commands from the email client. In one embodiment, the available messages may include one or more peer-to-peer messages that include wrapped email messages. The mail transfer agent may get the wrapped email messages from the peer-to-peer messages.

In one embodiment, the mail transfer agent may package peer-to-peer messages as email messages for the email client.

For example, a peer-to-peer service or other peer-to-peer entity may generate peer-to-peer messages for a user. The user may desire to view the peer-to-peer messages from the peer-to-peer service using an email client. The mail transfer agent may package the peer-to-peer messages in email messages and send the email messages to the email client.

Users may access the email client to view received email messages, for example email messages that were sent from other email clients via the peer-to-peer network and/or email messages that include packaged peer-to-peer messages from peer-to-peer entities such as services.

Figure 1A:
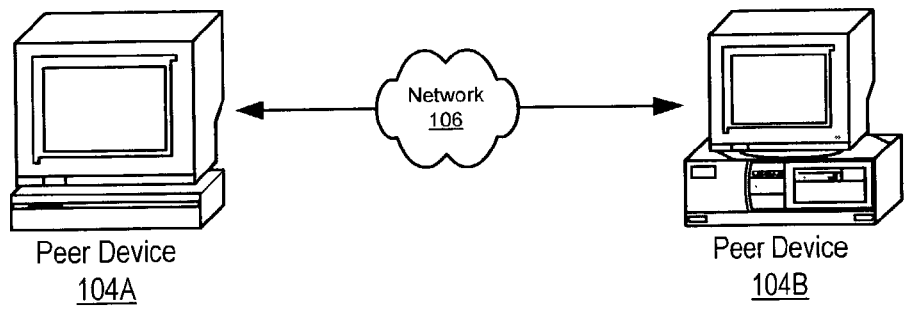
FIG. 1A illustrates two connected peer devices according to the prior art.
Figure 1B:
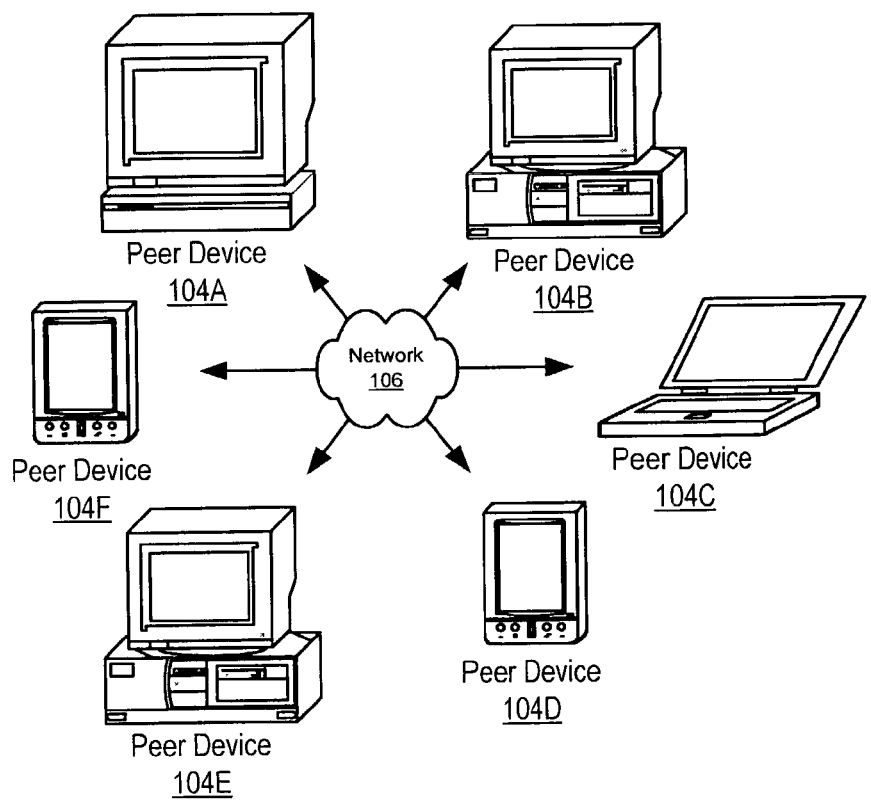
FIG. 1B illustrates several peer devices connected over a network in a peer group according to the prior art.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Embodiments of a system and method for facilitating communications between peers in a peer-to-peer environment and network email clients are described. One embodiment may include a mail transfer agent that may facilitate communications between peers in a peer-to-peer environment and email clients. The mail transfer agent may act as a bridge between one or more peer-to-peer platform protocols and one or more email communication protocols. In one embodiment, the mail transfer agent may communicate with one or more peers according to one or more peer-to-peer protocols of a peer-to-peer platform such as the exemplary peer-to-peer platform described below. The mail transfer agent may also communicate with one or more email clients according to one or more email communications protocols, for example the X.400 email messaging protocol specified by the International Telecommunications Union—Telecommunication Standard Sector (X.400), the Simple Mail Transfer Protocol (SMTP), the Post Office Protocol (POP), the Internet Message Access Protocol (IMAP), etc. In one embodiment, an email clients may communicate with mail transfer agents to send email messages to peers in the peer-to-peer environment. In one embodiment, peers may communicate with mail transfer agents to send peer-to-peer messages to one or more email clients.

While embodiments of the system and method for enabling communications between peers in a peer-to-peer environment and network email clients are generally described in reference to an exemplary peer-to-peer platform as described below, it is to be understood that embodiments may be used in other peer-to-peer environments implemented in accordance with other peer-to-peer platforms for enabling communications between peers in the respective peer-to-peer environment and network email clients.

In one embodiment, an address formatted according to an email message protocol (e.g. the IETF RFCs), a peer-to-peer network UUID (as described below for an exemplary peer-to-peer platform), or a combination of the two, may identify a user of one or more email clients or a peer of a peer-to-peer environment. A message sent from an email client or a peer may include one or more destination addresses identifying one or more intended recipients of the message. The mail transfer agent may store a message sent from an email client or a peer in one or more inboxes corresponding to one or more destination addresses of the messages. In one embodiment, each inbox may correspond to a different address.

In one embodiment, a user (via an email client) or a peer (via a peer-to-peer pipe) may access an inbox to obtain available messages by communicating with the mail transfer agent. In one embodiment, accessing an inbox may require authentication of the user's or the peer's identity. For example, the user or the peer may be required to provide an identification name (e.g. a string, a number, a base address, an email address, etc.) and a password before the mail transfer agent allows access to an inbox corresponding to the address. In one embodiment, if a mail transfer agent receives a message for a peer, the mail transfer agent may send the message to the peer as an alternative to storing the message in an inbox.

The email clients may provide a familiar interface to the users for sending, receiving, reading, and replying to messages. Email clients with network access to a node hosting a mail transfer agent may participate in asynchronous messaging with peers in a peer-to-peer environment. For example, a user may use an email client to issue commands to a peer-to-peer platform service via a mail transfer agent. As another example, a mail transfer agent may receive automatically generated status reports from a peer-to-peer platform service and provide the reports to an email client packaged in email messages. A user may view the reports using the email client. As another example, a user may issue a search query to a peer-to-peer platform service and receive search results from the peer-to-peer platform service packaged in email messages via an email client with access to a mail transfer agent.

Figure 2:
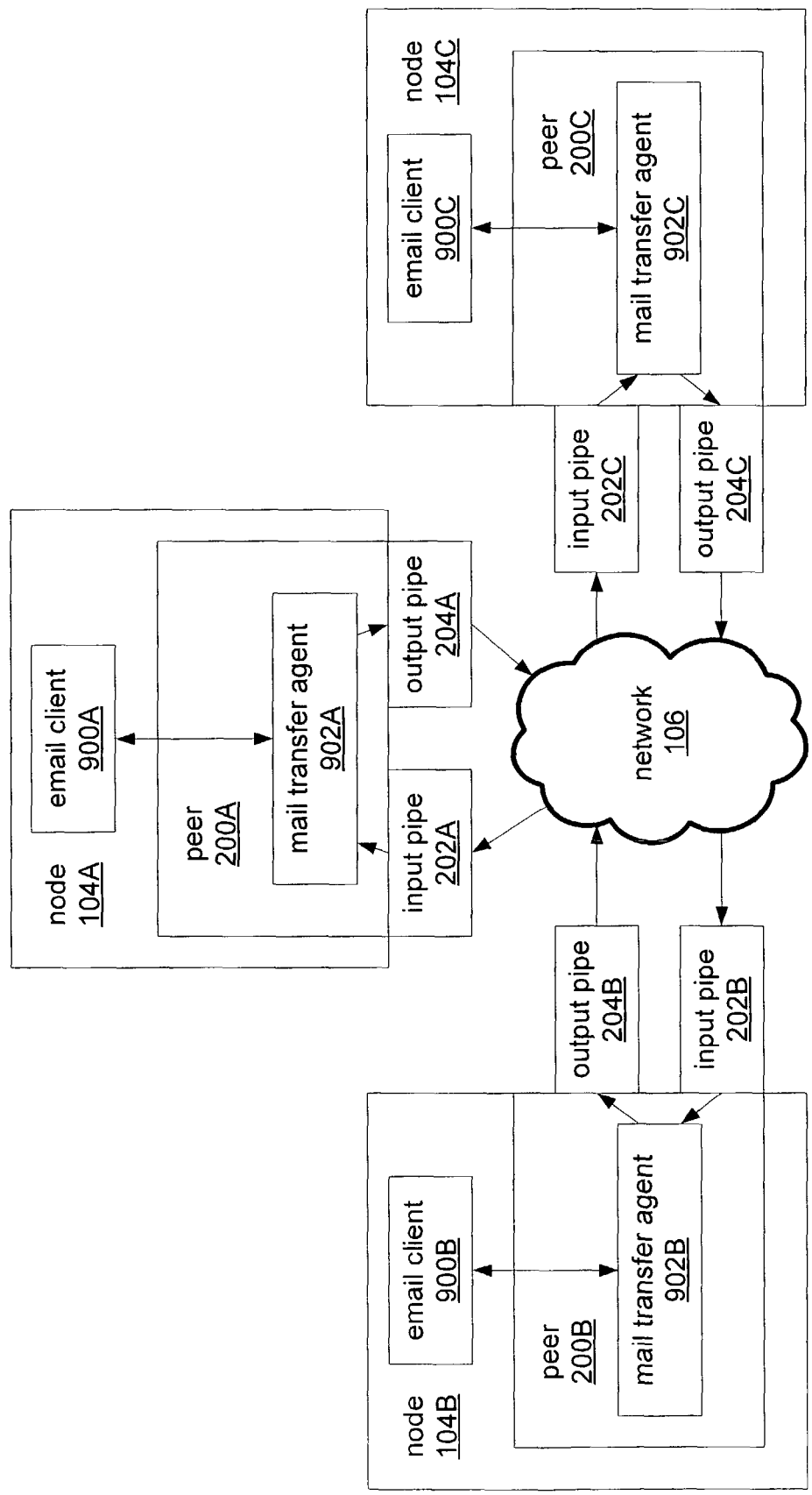
FIG. 2 illustrates one embodiment of a mail transport agent for sending and receiving email messages in a peer-to-peer environment.

FIG. 2 illustrates one embodiment of a mail transport agent for sending and receiving email messages in a peer-to-peer environment. In a network, email clients 900 may be coupled to peers 200 hosting mail transfer agents 902. In one embodiment, a peer 200 and an email client 900 may be hosted on a network node 104. In one embodiment, the email client 900 may be on a different node coupled to the node hosting peer 200 via network 106. Nodes 104 may include one or more of, but are not limited to, server systems, desktop personal computers, laptops, PDAs, and other intelligent devices coupled to network 106.

In one embodiment, the email clients 900 may include, but are not limited to, email applications (e.g. Sun Mailtool, Microsoft Outlook™, etc.) and web-based email services accessed via web browsers (e.g. HotJava Browser, Netscape Navigator™, Microsoft Internet Explorer™, etc.). Email clients 900 may access mail transfer agents 902 to send and receive email messages in the peer-to-peer environment. In one embodiment, mail transfer agents 902 may be peer-to-peer network services that may communicate with the email clients 900 using one or more email communications protocols (further described below) and that may communicate with other peers 200, for example over peer-to-peer protocol pipes as described above.

In one embodiment, a mail transfer agent 902 may provide interfaces to one or more email communication protocols (e.g. X.400, SMTP, POP, IMAP, etc.) for email clients 900 of the mail transfer agent 902. The mail transfer agents 902 may serve as bridges between peer-to-peer platform protocols and the email communication protocols. Thus, the mail transfer agents 902 may allow users operating within the peer-to-peer environment to use an email client 900 of their choice even if the email client 900 does not support peer-to-peer platform protocols.

In one embodiment, the email clients 900 may use an email communication protocol (e.g. X.400, SMTP, POP, IMAP, etc.) to communicate with the mail transfer agents 902 to send and receive email messages. As an example, email client 900A may use an email communication protocol to communicate with mail transfer agent 902A to send an email message to peer 200B. As another example, email client 900B may use an email communication protocol to request email messages from mail transfer agent 902B.

In one embodiment, a mail transfer agent 902 may provide a socket (i.e. a virtual communication interface) for each of the one or more email communication protocols provided by the mail transfer agents 902. An email client 900 may open a socket connection to a socket of a mail transfer agent 902 associated with an email communication protocol being used and issue one or more email communication protocol commands to send an email message via the mail transfer agent or to request available email messages from the email transfer agent. After completing communications, the email client 900 may close the connection to the socket.

In one embodiment, the mail transfer agents 902 may provide an alternative to subscriptions to centralized email servers for email clients. For example, email addresses formatted according to The Internet Engineering Task Force (IETF) Requests for Comments (RFCs) may be advertised in the peer-to-peer environment using the peer discovery protocol described above as well as or as an alternative to being hosted by centralized email servers. In one embodiment, a peer 200 including or with access to a mail transfer agent 902 may advertise one or more email addresses of an email client(s) in the peer's peer advertisement and/or in other advertisements. In embodiments, an advertised email address may include an email address formatted according to an email message protocol (e.g. the IETF RFCs), a peer-to-peer network UUID (as described above), or a combination of the two. In one embodiment, a peer 200 may participate in a peer discovery protocol to discover peers' email addresses and corresponding peer information. In one embodiment, a peer 200 may store discovered email addresses and their corresponding peer information.

As an example of an email client sending an email message to a peer via a mail transfer agent, email client 900A may be used to compose and send an email message to peer 200B. The email message may be formatted according to an email message protocol (e.g. an IETF RFC) supported by email client 900A. In one embodiment, email client 900A may use an email communication protocol (e.g. SMTP, X.400, etc.) to send the email message to mail transfer agent 902A. In one embodiment, mail transfer agent 902A may provide a socket for an email communication protocol for sending email messages. Email client 900A may open a socket connection to the socket associated with the email communication protocol and send the email message to mail transfer agent 902A in accordance with the email communication protocol. Email client 900A may then close the connection to the socket.

Continuing the example, mail transfer agent 902A may receive the email message from email client 900A. The email message may include a destination address or addresses indicating a destination or destinations of the email message. Mail transfer agent 902A may determine a destination peer or peers corresponding to the destination address or addresses. In one embodiment, each destination address may include an email address (e.g. formatted according to IETF RFCs). In one embodiment, mail transfer agent 902A may use a peer discovery protocol (as described above) to determine the peer(s) associated with the email address(es). In one embodiment, email addresses may be included within peer advertisements that may be published in the peer-to-peer environment to allow discovery by mail transfer agent 902A. In one embodiment, each mail transfer agent 902 may publish, according to the peer discovery protocol, an advertisement including one or more email addresses and the email addresses' corresponding peer locations (e.g. UUID and/or peer advertisement). A published advertisement for the target peer may be discovered by peer 200A using the destination address and information describing the target peer may be accessed from the advertisement to be used in forwarding the message to the destination peer.

In this example, mail transfer agent 902A may determine that peer 200B corresponding to a destination address is a destination peer. Peer 200B's peer advertisement may include an email address matching the destination address of the email message. Mail transfer agent 902A may obtain peer 200B's peer advertisement using the peer discovery protocol. The peer advertisement may also include a pipe endpoint at which peer 200B may receive email messages. In one embodiment, mail transfer agent 902A may bind output pipe 204A to input pipe 202B from peer 200A hosting mail transfer agent 902A to peer 200B. Mail transfer agent 902A may bind to the pipe using the pipe binding protocol as described above.

Mail transfer agent 902A may package the email message as a peer-to-peer message for transport over the pipe. In one embodiment, to package the email message, mail transfer agent 902A may generate a wrapper in accordance with a peer-to-peer platform protocol of the peer-to-peer environment and wrap the email message with the wrapper. In one embodiment, the wrapper may include markup language statements (e.g. XML) in accordance with the peer-to-peer platform protocol of the peer-to-peer environment. Mail transfer agent 902A may send the packaged email message over the pipe to peer 200B from output pipe 204A to input pipe 202B.

Peer 200B may receive the packaged email message sent from peer 200A over the pipe. Peer 200B may include mail transfer agent 902B. In one embodiment, peer 200B may route packaged email messages from input pipe 202B to mail transfer agent 902B. In one embodiment, peer 200B may store the packaged email message in response to receiving the packaged email message from mail transfer agent 902B. Mail transfer agent 902B may store the packaged email message in a storage medium local to peer 200B. Alternatively or additionally, the packaged email message may be stored remotely in a storage medium accessible over the network by peer 200B.

In one embodiment, the email message may include one or more destination addresses. As described above, pipes may offer several modes of communication. In one embodiment, mail transfer agent 902A may send the email message to each peer corresponding to a destination address via a point-to-point pipe. In one embodiment, a point-to-point pipe may connect two peer endpoints together, an input pipe that receive messages sent from an output pipe. In one embodiment, point-to-point pipes may provide a direct link between two peers. In one embodiment, point-to-point pipes may pass through one or more intermediate network nodes between endpoint peers linked by the pipes.

In one embodiment, the destination addresses may correspond to a peer group or a category of peers. Mail transfer agent 902A may send the email message to the peers of the peer group or category of peers via a propagate pipe. In one embodiment, a propagate pipe may connect two or more peer endpoints together, from one output pipe to one or more input pipes. In one embodiment, multiple copies of the message may be created to be sent via a propagate pipe.

Continuing with the example, email client 900B may access mail transfer agent 902B using an email communication protocol (e.g. POP or IMAP) to request available email messages, if any. In one embodiment, mail transfer agent 902B may provide one or more interfaces accessible by email client 900B for communication using one or more email communication protocols. In one embodiment, mail transfer agent 902B may provide a socket for an email communication protocol for receiving email messages (e.g. POP and/or IMAP). Email client 900B may open a socket connection and issue one or more commands according to an email communication protocol to request available email messages from mail transfer agent 902B.

Mail transfer agent 902B may receive the commands from email client 900B. In one embodiment, a command may identify a destination address for which email messages are being requested. In one embodiment, the destination address may include a UUID. In one embodiment, the destination address may include an email address. In one embodiment, mail transfer agent 902B may include one or more inboxes for storing available email messages. In one embodiment, each inbox may correspond to a particular destination address. In one embodiment, the inboxes may be email communication protocol (e.g. POP, IMAP, etc.) inboxes.

In embodiments, mail transfer agent 902B may retrieve available messages from the inbox corresponding to the destination address in response to the commands from email client 900B. In one embodiment, mail transfer agent 902B may unpackage packaged email messages of the specified messages. In one embodiment, unpackaging the packaged email messages may include stripping the packaged email messages of peer-to-peer platform protocol statements from the email messages. Mail transfer agent 902B may obtain email messages formatted according to an email message protocol (e.g. an IETF RFC) by unpackaging the email messages.

A peer-to-peer service may generate peer-to-peer messages, for example system administration messages, system administration logs, search results, etc. In one embodiment, the peer-to-peer service may provide the peer-to-peer messages to a mail transfer agent. The mail transfer agent may store the messages for access by a user. Continuing the example from above, one or more of the available messages of the inbox may be peer-to-peer messages from a peer-to-peer service and may not include email messages. Mail transfer agent 902B may package the peer-to-peer messages as email messages for email client 900B. A user may desire to view the peer-to-peer messages from the peer-to-peer service using an email client, for example Sun Mailtool, Microsoft Outlook, etc. In one embodiment, to package a peer-to-peer message, mail transfer agent 902B may generate a wrapper in accordance with an email communication protocol, for example an IETF RFC, SMTP, X.400, etc. Mail transfer agent 902B may wrap the peer-to-peer message with the wrapper. The packaged peer-to-peer message (the wrapper and the peer-to-peer message within) may form an email message. In one embodiment, the wrapper may include statements specified by the email communication protocol; for example the wrapper may include Multipurpose Internet Mail Extensions (MIME) statements, XML statements, headers in accordance with an IETF RFC, etc.

Mail transfer agent 902B may provide the email messages including email messages from other clients and email messages with packaged peer-to-peer content to email client 900B (in one embodiment, via a socket connection). In one embodiment, email client 900B may provide a user interface in which a user may view, store, reply to, or otherwise manage received messages. Email client 900B may then close the connection to the socket.

Figure 3:
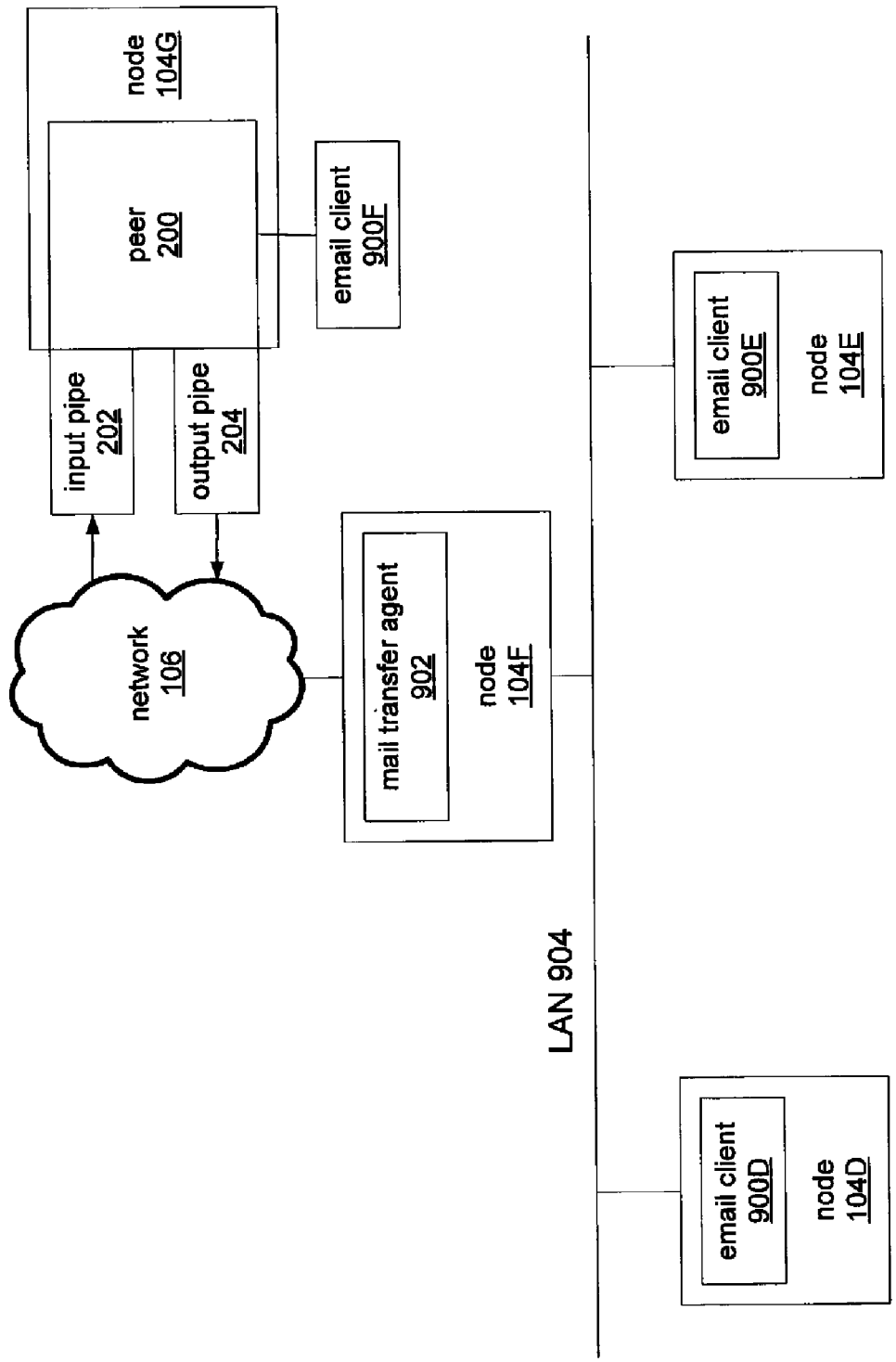
FIG. 3 illustrates one embodiment of a mail transfer agent for providing communication between email clients on a LAN and peers participating in a peer-to-peer environment.

FIG. 3 illustrates one embodiment of a mail transfer agent providing communication between email clients on a LAN and peers participating in a peer-to-peer environment. In one embodiment, nodes 104D and 104E of LAN 904 may host email clients 900D and 900E, respectively. Node 104F may host mail transfer agent 902 accessible to email clients of LAN 904. In one embodiment, node 104F may be a node of LAN 904. In another embodiment, node 104F may be a node on another network (e.g. another LAN, a wide area network, the Internet, etc.) accessible to email clients of LAN 904 via a network gateway or bridge that may couple LAN 904 to the network of which node 104F is a node. Mail transfer agent 902 may be accessible by one or more peers participating in a peer-to-peer environment, for example peer 200 hosted by node 104G. In one embodiment, mail transfer agent 902 may be hosted by a peer participating in the peer-to-peer environment. In one embodiment, mail transfer agent 902 may serve as a bridge for messages between email clients 900 on LAN 904 and peers participating in the peer-to-peer environment.

Email clients 900D and 900E may interface over LAN 904 with mail transfer agent 902 to send messages to and/or receive messages from peer 200. Email client 900F coupled to peer 200 may interface with mail transfer agent 902 to send messages to and/or receive messages from email clients 900D and 900E. As an example, email client 900D may be used to compose and send an email message to peer 200. In one embodiment, email client 900D may use an email communication protocol to send the email message over LAN 904 to mail transfer agent 902. In one embodiment, mail transfer agent 902 may provide an interface for the email communication protocol for sending email messages to email clients 900 hosted by nodes 104 of LAN 904. Email client 900D may use the interface to issue one or more email communication protocol commands to send the email message to mail transfer agent 902. The email message may include destination addresses indicating one or more destinations of the email message.

In one embodiment, mail transfer agent 902 may store the email message in an inbox corresponding to the destination address. Peer 200 may interface over the network with mail transfer agent 902 to request available messages from the inbox corresponding to the destination address. In one embodiment, the request may indicate a pipe endpoint at which peer 200 may receive email messages.

Alternatively, mail transfer agent 902 may determine destination peers corresponding to the destination addresses. Mail transfer agent 902 may determine, for example, that peer 200 corresponds to a destination address of the email message. In one embodiment, mail transfer agent 902A may store a list of destination addresses and peer information corresponding to the destination addresses. Mail transfer agent 902A may access the list to determine peer information corresponding to a destination address. If the destination address is not included in the list, mail transfer agent 902A may use a peer discovery protocol to determine peer information corresponding to the destination address. Mail transfer agent 902A may obtain peer 200's peer information from a stored list or alternatively using the peer discovery protocol. In one embodiment, the peer information may include a peer advertisement. The peer advertisement may indicate a destination address and a pipe endpoint at which peer 200 may receive email messages.

In one embodiment, mail transfer agent 902 may bind an output pipe to input pipe 202 of peer 200. Mail transfer agent 902 may bind to the pipe using the pipe binding protocol as described above. Mail transfer agent 902 may package the email message for transport over the pipe as a peer-to-peer message. Mail transfer agent 902 may send the packaged email message over the pipe to peer 200.

In one embodiment, peers participating in the peer-to-peer environment may send messages to email clients 900 hosted by nodes 104 of LAN 904 via mail transfer agent 902. For example, a service of peer 200 may send a peer-to-peer message to mail transfer agent 902 for one or more email clients 900. The peer-to-peer message may indicate one or more destination addresses corresponding to one or more users of email clients 900. In one embodiment, mail transfer agent 902 may generate an email message (e.g. in accordance with IETF RFCs) including the destination address(es) from the peer-to-peer message and the peer-to-peer message itself (e.g. as an attachment or inline). In one embodiment, generating the email message may include adding one or more statements specified by an email communication protocol (e.g. MIME headers) to the peer-to-peer message.

In one embodiment, mail transfer agent 902 may store the email message in one or more inboxes (e.g. POP or IMAP inboxes) corresponding to the destination addresses of the peer-to-peer message. The inboxes may be accessible to the email clients 900 (in one embodiment, via the socket connection) to retrieve messages. In one embodiment, access to an inbox may require authentication in accordance with an email communications protocol (e.g. POP or IMAP).

Mail transfer agent 902 may serve as a bridge between email clients 900D and 900E of LAN 904 and the peer-to-peer environment. Users of email clients not included within the peer-to-peer environment may interact with the peer-to-peer environment via mail transfer agent 902. For example, users may issue commands to peers, view messages from peers, respond to messages from peers, and/or archive messages from peers via email clients 900D and 900E through the bridge to the peer-to-peer environment provided by mail transfer agent 902.

Figure 4:
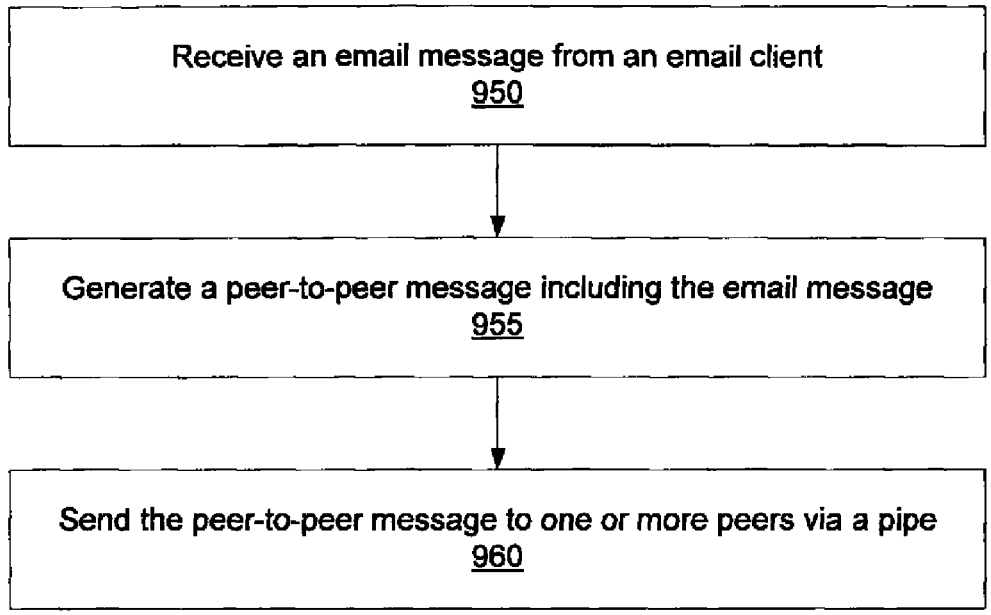
FIG. 4 illustrates one embodiment of a method for sending messages from email clients on a network to peers participating in a peer-to-peer environment on the network.

FIG. 4 illustrates one embodiment of a method for sending messages from email clients on a network to peers participating in a peer-to-peer environment on the network. A mail transfer agent may receive an email message from an email client as indicated at 950. The email message may include one or more destination addresses. In one embodiment, for each destination address, the mail transfer agent may determine a destination peer of the peer-to-peer environment. In one embodiment, a peer may publish a destination address for discovery by mail transfer agents and other peers. In one embodiment, a peer's destination address may be published in a peer advertisement corresponding to the peer. In one embodiment, the mail transfer agent may determine a destination peer from a destination address using a peer discovery protocol to discover a peer advertisement including the destination address. The peer advertisement may also include information indicating a pipe endpoint for receiving email messages.

The mail transfer agent may generate a peer-to-peer message including the email message to send to the peer corresponding to the destination address as indicated at 955. In one embodiment, generating the peer-to-peer message may include generating a wrapper in accordance with a peer-to-peer protocol in which to encapsulate the email message. The mail transfer agent may bind an output pipe of the mail transfer agent to an input pipe of the destination peer in accordance with a peer-to-peer pipe binding protocol.

The mail transfer agent may send the peer-to-peer message to the destination peer(s) over the pipe as indicated at 960. Alternatively, the mail transfer agent may store the peer-to-peer message in an inbox corresponding to the destination address for retrieval by the destination peer. In one embodiment, the destination peer may store a received peer-to-peer message, or alternatively the peer-to-peer message may be provided to a service of the destination peer. In one embodiment, a mail transfer agent of the destination peer may obtain the email message from the peer-to-peer message (e.g. by stripping the message of statements of the peer-to-peer platform protocol), and provide the email message to a destination email client. A user of the email client may then access the email message.

Figure 5:
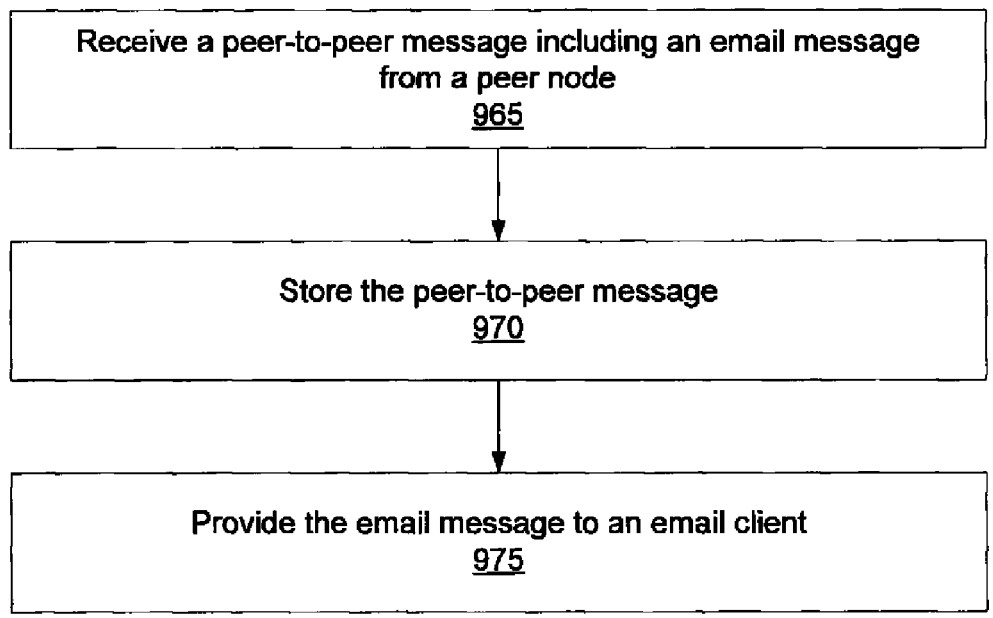
FIG. 5 illustrates one embodiment of a method for obtaining an email message from a peer-to-peer message.

FIG. 5 illustrates one embodiment of a method for obtaining an email message from a peer-to-peer message. A peer participating in a peer-to-peer environment on a network may receive a peer-to-peer message that may include an email message from a mail transfer agent via a pipe as indicated at 965. The peer-to-peer message may be formatted according to a peer-to-peer platform protocol of the peer-to-peer environment. The peer may store the peer-to-peer message in a data store as indicated at 970. In one embodiment, the data store may be local to the peer (e.g. a network node may include both the data store and the peer). In one embodiment, the data store may be accessible to the peer over the network (e.g. a database or file server). The peer may access the peer-to-peer message from the data store to provide the message to a service and/or an email client as indicated at 975 via another mail transfer agent of the peer. In one embodiment, the other mail transfer agent may include an email inbox corresponding to an email address. An email client may access the inbox and retrieve the email message included in the peer-to-peer message.

Figure 6:
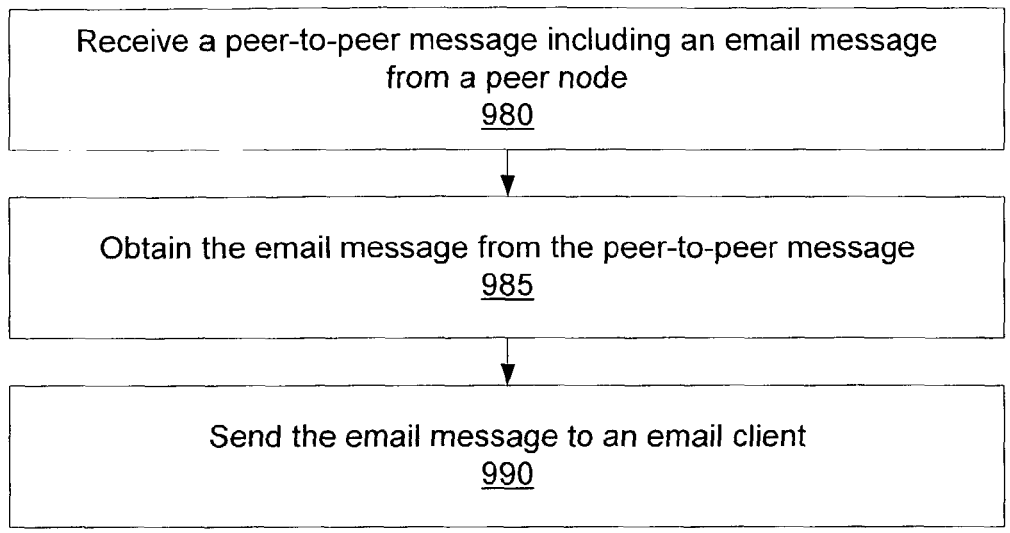
FIG. 6 illustrates one embodiment of a method for providing an email message to an email client.

FIG. 6 illustrates one embodiment of a method for providing an email message to an email client. The peer may receive a peer-to-peer message including an email message from a mail transfer agent as indicated at 980. The peer may obtain the email message from the peer-to-peer message as indicated at 985. In one embodiment, to obtain the email message, another mail transfer agent of the peer may parse the peer-to-peer message and delete any peer-to-peer platform protocol statements to leave only the email message. The other mail transfer agent may send the email message to an email client coupled to the peer as indicated at 990. The node hosting the peer may also host the email client. Alternatively, the peer may be coupled to the email client (hosted on another node) over the network. In one embodiment, the email client may provide a user interface in which to display, reply to, store or otherwise manage the email message to a user.

Figure 7:
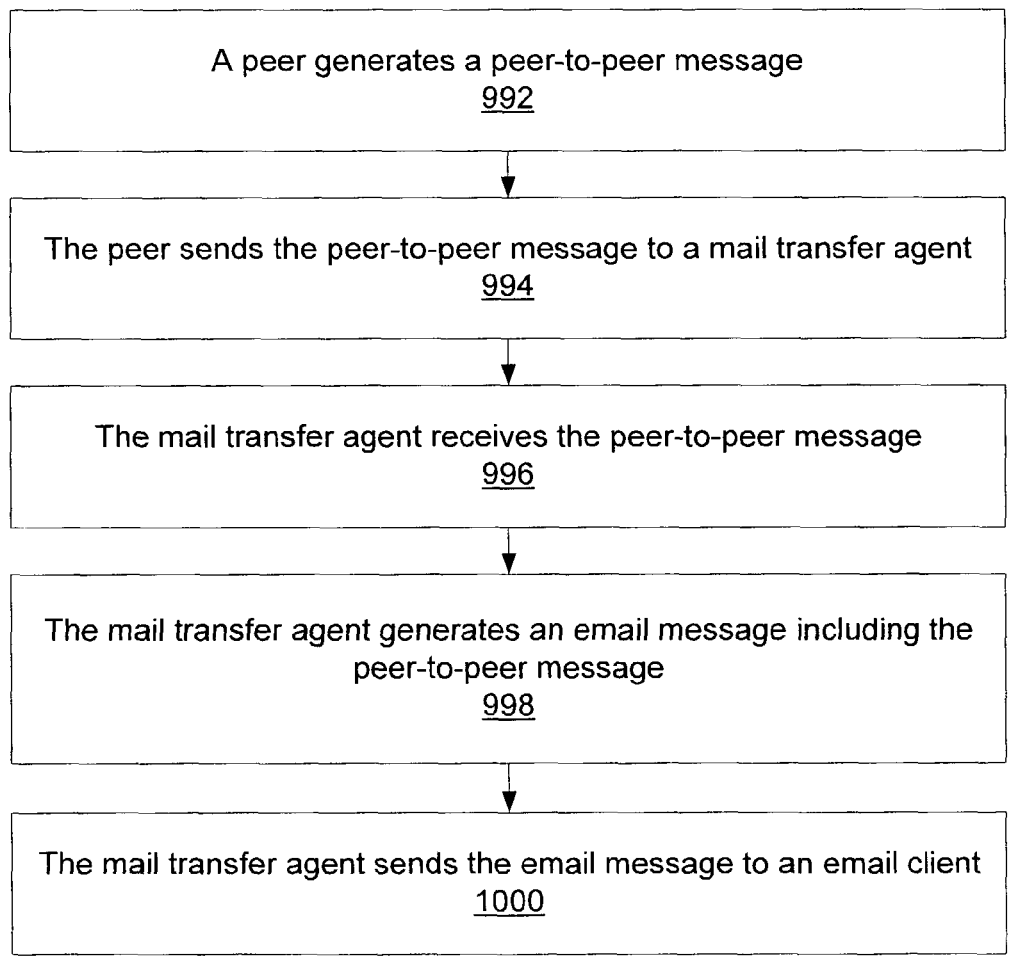
FIG. 7 illustrates one embodiment of a method for sending a peer-to-peer message to an email client.

FIG. 7 illustrates one embodiment of a method for sending a peer-to-peer message to an email client. A peer participating in the peer-to-peer environment may generate a peer-to-peer message to send to one or more users of email clients as indicated at 992. For example, a service of the peer may generate a peer-to-peer message (e.g. a search result, a status report, a data file, etc.) for one or more users of email clients. The peer may send the peer-to-peer message to a mail transfer agent on a network as indicated at 994. In one embodiment, the peer may host the mail transfer agent. In one embodiment, another peer of the peer-to-peer environment may host the mail transfer agent. The peer-to-peer message may include an indication of one or more destination addresses corresponding to the one or more users of the email clients.

The mail transfer agent may receive the peer-to-peer message as indicated at 996. The mail transfer agent may generate an email message (e.g. in accordance with IETF RFCs) addressed to the destination address(es) included within the peer-to-peer message as indicated at 998. In one embodiment, the peer-to-peer message may not include destination addresses, and the mail transfer agent may be configured to generate destination addresses according to the source of the peer-to-peer message. For example, the mail transfer agent may be configured to address email messages generated from peer-to-peer messages from a particular peer to a particular email address.

The email message may include the peer-to-peer message, for example as an attachment or inline. In one embodiment, generating the email message may include adding one or more statements specified by an email communication protocol (e.g. MIME headers) to the peer-to-peer message. In one embodiment, the mail transfer agent may store the email message in one or more of the inboxes corresponding to the destination address(es) of the peer-to-peer message. In one embodiment, the inboxes may be accessible to one or more of the email clients via a socket connection. In one embodiment, access to the inbox may require authentication in accordance with an email communications protocol (e.g. POP and/or IMAP).

An email client may communicate with the mail transfer agent according to the email communications protocol to get available messages. In one embodiment, the email client may send one or more commands of the email communications protocol to the mail transfer agent via a socket connection over the network. The mail transfer agent may respond by sending the email client the email message including the peer-to-peer message as indicated at 1000. The email client may archive the email message and/or the email client may allow a user to interact with the message. For example, the email client may allow a user to view the message, to reply to the message (e.g. with requests, information, confirmation, etc. for the peer), and/or to perform other tasks related to the messages.

Peer-to-Peer Platform

The following is a description of an open network computing platform designed for peer-to-peer computing in which embodiments of the system and method for facilitating communications between peers in a peer-to-peer environment and network email clients as described herein may be implemented. It is noted that this description is included for exemplary purposes and that embodiments of the system and method for facilitating communications between peers in a peer-to-peer environment and network email clients as described herein may be used with other peer-to-peer platforms and protocols.

The network computing platform may be referred to as a peer-to-peer platform. The peer-to-peer platform may be used to build a wide range of distributed services and applications in which every device is addressable as a peer, and where peers can bridge from one domain into another. The peer-to-peer platform may enable developers to focus on their own application development while easily creating distributed computing software that is flexible, interoperable, and available on any peer on the expanded Web. The peer-to-peer platform may enable software developers to deploy interoperable services and content, further spring-boarding the peer-to-peer revolution on the Internet. The peer-to-peer platform addresses the problems of prior art peer-to-peer systems by providing a generic and service-agnostic peer-to-peer platform that may be defined by a small number of protocols. Each protocol may be easy to implement and easy to be adopted into peer-to-peer services and applications. Thus, service offerings from one vendor may be used, perhaps transparently, by the user community of another vendor's system.

The peer-to-peer platform extends P2P computing to enable a wide range of distributed computing applications and overcome the limitations typically found in prior art P2P applications. The peer-to-peer platform is a network computing technology that provides a set of simple, small, and flexible mechanisms that can support P2P computing on any platform, anywhere, and at any time. The peer-to-peer platform generalizes P2P functionality and provides core technology that addresses the limitations of prior art P2P computing technologies.

The peer-to-peer platform is a modular platform that provides simple and essential building blocks for developing a wide range of distributed services and applications. The peer-to-peer platform specifies a set of protocols rather than an API. Thus, the peer-to-peer platform can be implemented in any language on any Operating System to provide solutions ranging from providing a simple protocol-based wrapper that enables a small device to join a network of peers to developing a fully integrated application that supports metering, monitoring, high-level security and communication across server-class systems.

In one embodiment, the peer-to-peer platform architecture may include, but is not limited to, protocols, advertisements, and core services. Network protocol bindings may be used to ensure interoperability with existing content transfer protocols, network transports, routers, and firewalls. The peer-to-peer platform may be used to combine network nodes (peers) into a simple and coherent peer-to-peer network computing platform. The platform may be directed at providing several benefits including, but not limited to, no single point of failure, asynchronous messaging, the ability for peers to adapt to their network environment, and moving content towards its consumers.

Figure 8:
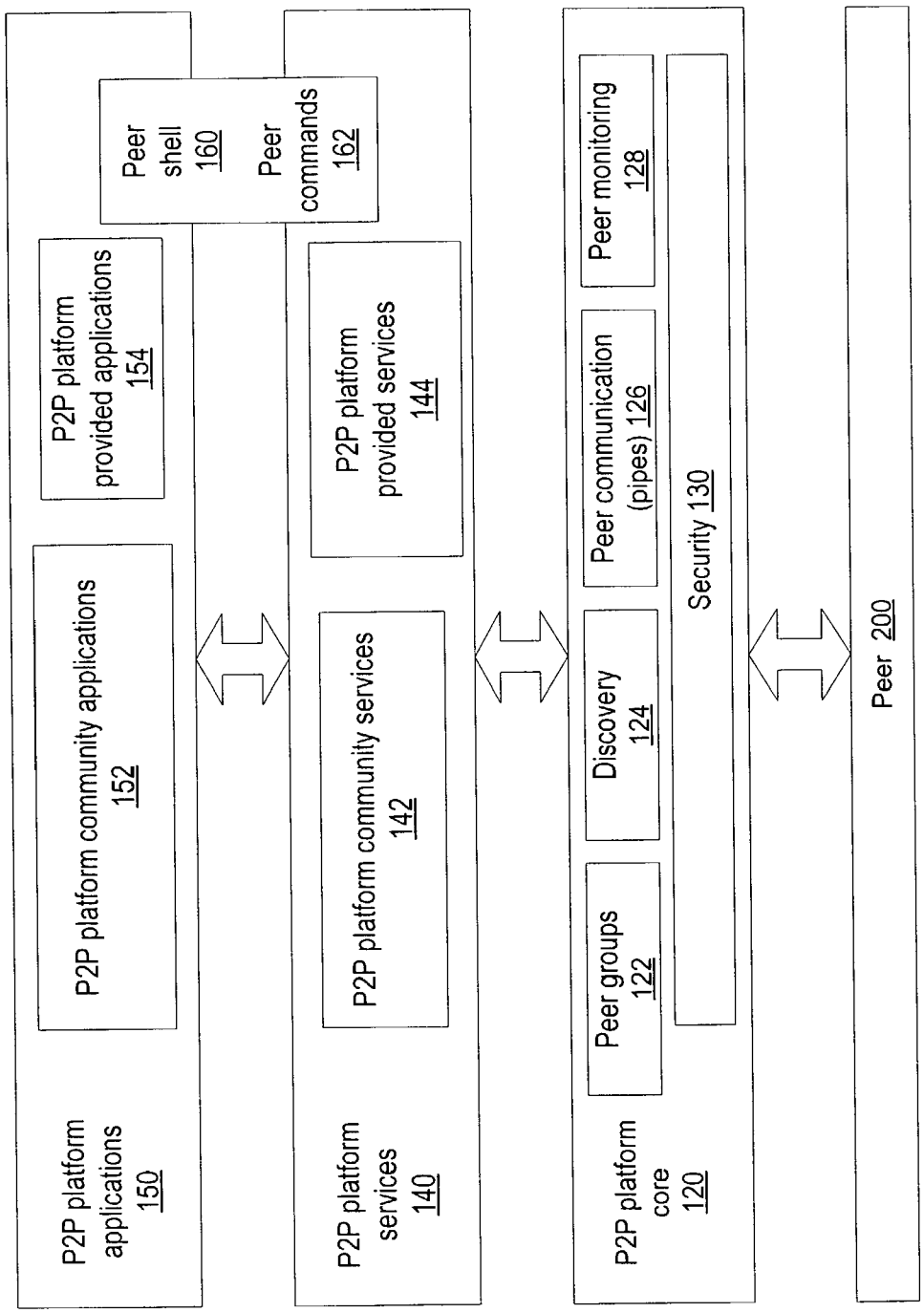
FIG. 8 illustrates one embodiment of peer-to-peer platform software architecture at the conceptual level.

FIG. 8 illustrates one embodiment of peer-to-peer platform software architecture at the conceptual level. The peer-to-peer platform may include several layers. In one embodiment, the software stack may be described using three layers; a peer-to-peer platform (core) layer 120, a service layer 140 and an application layer 150. In one embodiment, the peer-to-peer platform may include a core layer 120 that defines and encapsulates minimal primitives that are common to peer-to-peer networking, including, but not limited to, peers 110, peer groups 122, peer discovery 124, peer communication (e.g. pipes) 126, peer monitoring 128, and associated security primitives 130. All peer-to-peer devices in a peer-to-peer environment implemented in accordance with the peer-to-peer platform may share this layer so that interoperability becomes possible.

A peer may be defined as any entity that runs some or all of one or more protocols provided by the peer-to-peer platform core layer. As such, a peer may manifest in the form of a processor, a process or a device. A peer may be anything with a digital heartbeat that supports the peer-to-peer platform core, including sensors, servers, PCs, computers up to and including supercomputers, PDAs, manufacturing and medical equipment, phones and cellular phones. In order to interact with other peers (e.g. to form or join peer groups), the peer needs to be connected to some kind of network (wired or wireless), such as IP, Bluetooth, or Havi, among others.

The peer-to-peer platform may provide mechanisms through which peers may discover each other, communicate with each other, and cooperate with each other to form peer groups. Peers may discover each other on the network to form transient or persistent relationships called peer groups. A peer group is a collection of peers connected by a network that share a common set of interests and that have agreed upon a common set of rules to publish, share and access any computer content (code, data, applications, or other collections of computer representable resources), and communicate among themselves. Peer groups may also be statically predefined. The peers in a peer group may cooperate to provide a common set of services. A peer group may be viewed as an abstract region of the network, and may act as a virtual subnet. The concept of a region virtualizes the notion of routers and firewalls, subdividing the network in a self-organizing fashion without respect to actual physical network boundaries. In one embodiment, peer groups implicitly define a region scope that may limit peer propagation requests. Conceptually, a peer group may be viewed as a virtual entity that speaks the set of peer group protocols.

A peer group may theoretically be as large as the entire connected universe. Naming anything uniquely is a challenge in such a large namespace. In one embodiment, the peer-to-peer platform may support and/or provide sophisticated naming and binding services. In one embodiment, the peer-to-peer platform may use a universal unique identifier (UUID), for example, a 64- or 128-bit datum, to refer to an entity (e.g. a peer, peer group, pipe, content, etc.). For example, UUIDs may be embedded in advertisements for internal use. UUIDs may be used to guarantee that each entity has a unique UUID within a local runtime environment and serves as a canonical way of referring to an entity, but because a global state is not assumed, it may not be possible to provide a guarantee of uniqueness across an entire community that may consist of millions of peers. This may not be a problem because a UUID may be used within the peer-to-peer platform as an internal identifier. This may become significant only after the UUID is securely bound to other information such as a name and a network address. In one embodiment, Uniform Resource Name (URN) format may be used for the expression of UUIDs.

The core layer 120 provides core support for peer-to-peer services and applications. In a multi-platform, secure execution environment, the core mechanisms of peer groups, peer pipes and peer monitoring may be provided. Peer groups 122 may establish a set of peers and naming within a peer group with mechanisms to create policies for creation and deletion, membership, advertising and discovery of other peer groups and peer nodes, communication, security, and content sharing. Pipes provide virtual communication channels among peers. Messages sent in pipes may support transfer of data, content, and code in a protocol-independent manner, allowing a range of security, integrity, and privacy options. In one embodiment, messages may be structured with a markup language such as XML. Peer monitoring 128 enables control of the behavior and activity of peers in a peer group and can be used to implement peer management functions including access control, priority setting, traffic metering, and bandwidth balancing.

The core layer 120 may include protocols and building blocks to enable key mechanisms for peer to peer networking, including discovery, transport (including firewall handling and limited security), and the creation of peers and peer groups. The core layer 120 may be thin and small, and may provide interesting and powerful primitives for use by services and applications in the other layers. The core layer 120 may support choices such as anonymous vs. registered users and encrypted vs. clear text content without imposing specific policies on developers. Policy choices may be made, or when necessary, implemented, at the service layer 140 and/or application layer 150. For example, administration services such as accepting or rejecting a peer's membership in a peer group may be implemented using the functionality provided by the core layer 120.

The core components of the peer-to-peer protocol may be used to implement discovery mechanisms for searching, publishing and recovering of core abstractions (e.g. peers, peer group, pipes, endpoints, and advertisements). These mechanisms may be simple, administration free, and do not require special peers to act as "master" peers. These mechanisms may allow processes in the peer-to-peer network, in absence of help from other applications and/or services, to bootstrap and find out the information necessary to access applications and services that can help. In addition, the core may return to this standalone behavior and still function if helper applications or services fail. In one embodiment, safety mechanisms may be put in place in order to avoid a major overflow of web-crawling. In one embodiment, applications and/or services that support the peer-to-peer protocol may access, control, and/or override the core components, even to the extreme of implementing a centralized, client-server model based on the core components.

At the highest abstraction level, the peer-to-peer platform may be viewed as a set of protocols provided at the core layer 120. In one embodiment, a common thread among peer-to-peer platform peers is protocols, not APIs or software implementations. The peer-to-peer platform protocols may guarantee interoperability between compliant software components executing on potentially heterogeneous peer runtimes. Thus, the peer-to-peer platform may be agnostic to programming languages. The term compliant may refer to a single protocol only. That is some peers may not implement all the core protocols. Further, some peers may only use a portion (client-side or server-side only) of a protocol.

Each protocol may be defined by one or more messages exchanged among participants of the protocol. Each message may have a predefined format, and may include various data fields. In one embodiment, the protocols may utilize messaging such as XML messages. The peer-to-peer platform connects peer nodes with each other. The peer-to-peer platform may be platform-independent by virtue of being a set of protocols. As such, the peer-to-peer platform may not require APIs and remains independent of programming languages, so that it can be implemented in C/C++, Java, Java 2ME, Perl, Python or other languages. This means heterogeneous devices with completely different software stacks may interoperate through the peer-to-peer platform protocols. To underpin this set of protocols, the peer-to-peer platform may define a number of concepts including peer, peer group, advertisement, message, pipe, and more.

In one embodiment, peer-to-peer protocols may be embodied as markup language (e.g. XML) messages that may be sent between two peers. In one embodiment, the peer-to-peer platform messages may define the protocols used to discover and connect peers and peer groups, and to access resources offered by peers and peer groups, among others. The use of markup language (e.g. XML) messages to define protocols may allow many different kinds of peers to participate in a protocol. Each peer may be free to implement the protocol in a manner best suited to its abilities and role. For example, not all peers are capable of supporting a Java runtime environment. In one embodiment, the protocol definition does not require nor imply the use of Java on a peer.

Several peer-to-peer platform protocols that may be provided by embodiments of the peer-to-peer platform are described later in this document. The protocols defined in this document may be realized over networks including, but not limited to, the Internet, a corporate intranet, a dynamic proximity network, a home networking environment, LANs, and WANs. The protocols defined in this document may also be realized within a single computer. Thus, the peer-to-peer platform may be transport protocol independent. The size and complexity of the network peers that may support these protocols may include a wide range of peer implementations including peers implemented on, but not limited to, simple light switches, PDAs, cell phones, pagers, laptop and notebook computers, smart appliances, personal computers, workstations, complex, highly-available servers, mainframe computers and even supercomputers.

The peer-to-peer platform may further include a peer-to-peer services layer 140. This layer may provide capabilities that may not be necessary for a peer-to-peer network to operate but that may be desirable to provided added functionality beyond the core layer 120 in the peer-to-peer environment. The service layer 140 may deal with higher-level concepts such as search and indexing, directory, storage systems, file sharing, distributed file systems, resource aggregation and renting, protocol translation, authentication and PKI (public key infrastructure) systems. These services, which may make use of the protocols and building blocks provided by the core layer 120, may be useful by themselves but also may be included as components in an overall P2P system. Thus, services may include one or more services 144 provided by the peer-to-peer platform. These platform-provided services 144 may include indexing, searching and file sharing services, for example. The services layer 140 may provide hooks for supporting generic services (such as searching, sharing and added security) that are used in many P2P applications. Thus, services may also include one or more services 142 not provided as part of the peer-to-peer platform but rather provided by the peer-to-peer platform community. These services 142 may be user-defined and may be provided, for example, to member peers in a peer group as a peer group service.

Services may expand upon the capabilities of the core layer 120 and may be used to facilitate application development. Facilities provided as services in the service layer 140 may include mechanisms for search and indexing, directory, storage systems, file sharing, distributed file systems, resource aggregation and renting, protocol translation, authentication, PKI services, and caching code and content to enable cross-application bridging and translation of files, among others. Searching capabilities may include distributed, parallel searches across peer groups that are facilitated by matching an XML representation of a query to be processed with representations of the responses that can be provided by each peer. These facilities may be used for simple searches, for example searching a peer's repository, or more complex searches of dynamically generated content that is unreachable by conventional search engines. P2P searches may be conducted across a company's intranet, for example, to quickly locate relevant information within a secure environment. By exercising tight control over peer group membership and enabling encrypted communication between peers, a company may extend this capability to its extranet, including business partners, consultants, and suppliers as peers. The same mechanisms that facilitate searches across the peer group may be used as a bridge to incorporate Internet search results, and to include data outside of the peer's own repository, for example searching a peer's disk. The peer services layer 140 may be used to support other custom, application-specific functions. For example, a secure peer messaging system may be built to allow anonymous authorship and a persistent message store. The peer services layer 140 provides the mechanisms to create such secure tools; the application developers themselves may determine specific tool policies.

The peer-to-peer platform may also include a peer-to-peer application layer 150. The application layer 140 may support the implementation of integrated applications such as file sharing, resource sharing, monetary systems, distributed storage, peer-to-peer instant messaging, entertainment, content management and delivery, peer-to-peer email systems, distributed auction systems, among others. Applications may be "vertical" or they may be developed to interoperate with other distributed applications. One or more applications 154 may be provided as part of the peer-to-peer platform. For example, one embodiment of the peer-to-peer platform may include a shell application 160 as a development environment built on top of the platform. The shell application may provide interactive access to the peer-to-peer platform via a simple command line interface 162.

Applications may also include community applications 152 not provided by the peer-to-peer platform. These community applications 152 may be user-defined and may be provided, for example, to member peers in a peer group as a peer group application.

In one embodiment, the boundary between services and applications is not rigid. An application to one customer can be viewed as a service to another customer. An application may use services. Services may serve as protocols that may be shared among various applications. An application may provide a user interface, a way to define a set of files to share, a way to initiate a search, a way to display the results, and a way to initiate a file transfer, for example. Such an application may make use of a set of services, for example a reliable point-to-point file transfer service, a distributed search service, and a discovery service to locate other peers, among others.

Applications may be built using peer services as well as the core layer 120. The peer-to-peer platform may support the fundamental levels broadly, and rely on the P2P development community to provide additional peer services and applications. Peer applications enabled by both the core layer 120 and peer services layer 140 may include P2P auctions that link buyers and sellers directly, with buyers able to program their bidding strategies using a simple scripting language, for example. Resource-sharing applications, such as SETI@home, may be built more quickly and easily, with heterogeneous, worldwide peer groups supported from day one. Instant messaging, mail, and calendaring services may facilitate communication and collaboration within peer groups that are secure and independent of service provider-hosted facilities. Virtually any other type of application may be build on top of the core layer 120 and services layer 140.

Some features, such as security, may manifest in all three layers and throughout a P2P system, albeit in different forms according to the location in the software architecture. The system may be modular, and may allow developers to select a collection of services and applications that suits their needs.

A typical peer-to-peer platform network may provide an inherently nondeterministic topology/response structure. In a peer-to-peer platform network, a specific resource request may not return for minutes, hours, or even days; in fact, it may never return at all. In addition, people from different parts of the world requesting the same resource are likely to get different copies of the resource from completely different locations. Peers may obtain content from multiple servers, ideally reaching a nearby one that is up and running. The original source peer need not service every resource request; in fact, it does not even have to be up and running. The nondeterministic structure may also help provide the optimized use of network bandwidth. The concentrated localized traffic congestion typical of today's Web does not affect P2P networking. The nondeterministic structure may also help provide a lowered cost of content distribution. The P2P network can absorb contents and replicate it for easy access. The nondeterministic structure may also help provide leveraged computing power from every node in the network. With asynchronous operations, a user may issue many requests for many resources or services simultaneously and have the network do the work. The nondeterministic structure may also help provide unlimited scalability. A properly designed P2P application may span the entire known connected universe without hitting scalability limits; this is typically not possible with centralized schemes. Note, however, that the peer-to-peer platform also may support deterministic, synchronous applications.

The peer-to-peer platform provides the ability to replicate information toward end users. Popular content tends to be replicated more often, making it easier to find as more copies are available. Peers do not have to always go back to the same peer to obtain the information they want, as is typical in the client/server model. Peers may obtain information from neighboring peers that have already cached the information. Each peer may become a provider to all other peers.

In one embodiment, the peer-to-peer platform may enable peers to find content that is closest to them. This content may include data (e.g. files) or even services and applications. For example, if a peer node in an office peer-to-peer network using the peer-to-peer platform is moved, the peer-to-peer platform may allow the peer to automatically locate content (e.g. using a discovery service that participates in the discovery protocol) including services (e.g. a printer service and an email service) hosted by other peers closest to the peer's new location, without requiring any manual reconfiguration. Further, at least some content may be copied or moved to the peer in its new location and/or to other peers proximate to the new location.

The peer-to-peer platform may provide a decentralized environment that minimizes single points of failure and is not dependent on any centralized services. Both centralized and decentralized services may be developed on top of the peer-to-peer platform. With the addition of each new network peer, the network platform may become more robust as it expands. In the environment, services may be implemented to interoperate with other services giving rise to new P2P applications. For example, a P2P communications service like instant messaging may easily be added to a resource-sharing P2P application if both support at least the necessary peer-to-peer platform protocols.

The peer-to-peer platform may provide interoperability. The peer-to-peer platform may be used by developers independently of preferred programming languages, development environments, or deployment platforms. Embodiments of the peer-to-peer platform may enable interconnected peers to easily locate each other, communicate with each other, participate in community-based activities, and offer services to each other seamlessly across different P2P systems and different communities. The peer-to-peer platform may also provide platform independence. Embodiments of the peer-to-peer platform may be independent of programming languages (such as C/C++, Java, Perl, and KVM), system platforms (such as the Microsoft Windows, UNIX®, Solaris, Linux and Macintosh platforms), and networking platforms (such as TCP/IP, Bluetooth and Havi). Thus, heterogeneous devices with completely different software stacks may interoperate through the peer-to-peer platform protocols. Embodiments of the peer-to-peer platform may be implementable on any device with a digital heartbeat, including, but not limited to, sensors, consumer electronics, Personal Digital Assistants (PDAs), appliances, network routers, desktop computers, data-center servers, and storage systems. Embodiments of the peer-to-peer platform may enable peers, independent of software and hardware platform, to benefit and profit from being connected to millions of other peers.

In one embodiment, the peer-to-peer platform may run on any of various operating systems including embedded operating systems (with the appropriate level of Java runtime support, if required) such as Windows95, 98, 2000, ME, and NT, Solaris, Unix, Macintosh, Linux, Java 2 Platform, Micro Edition (J2ME) and PersonalJava Technology. The peer-to-peer platform may be implemented in any of a variety of development environments using any of a variety of programming languages, or combinations of programming languages, including, but not limited to, Java, Java 2ME, C/C++, Perl, Python and KVM. In one embodiment, the peer-to-peer platform may be implemented in Java. In one embodiment, a peer-to-peer platform may be implemented in C/C++ on some devices, for example, to support devices without Java support. In one embodiment, a peer-to-peer platform may be implemented in KVM on some devices, for example, so that all KVM capable devices such as PDAs and cell phones can be peer-to-peer platform peers. Programming languages other than those listed may also be used in various embodiments.

A minimal device with the ability to generate a text string may theoretically participate in a peer-to-peer platform network (though not necessarily in every P2P application). The simplistic device may need a surrogate peer on the P2P network. This surrogate peer may perform discovery, advertisement, and communications on behalf of the simplistic device (or many simplistic devices). The location of the surrogate may be hard-wired into the simplistic device. In this way, the simplistic device with the help of the surrogate can be a full-fledged peer on the peer-to-peer platform network. For example, a GPS locator, strapped to a sea turtle and sending out peer-to-peer platform messages wirelessly with location information, may become a peer on a peer-to-peer platform network.

The peer-to-peer platform may be independent of transport protocols. For example, the peer-to-peer platform may be implemented on top of TCP/IP, HTTP, Bluetooth, HomePNA, and other protocols. Thus, a system built on top of the peer-to-peer platform may function in the same or similar fashion when the system is expanded to a new networking environment or to a new class of devices, as long as there is a correct transport protocol handler for the new networking protocol.

In one embodiment, the peer-to-peer platform may use XML as the encoding format. XML may provide convenience in parsing and extensibility. Other embodiments of the peer-to-peer platform may use other encoding formats. The use of XML does not imply that all peer-to-peer platform peer nodes must be able to parse and to create XML documents. For example, a cell phone with limited resources may be programmed to recognize and to create certain canned XML messages and can still participate in a peer-to-peer platform network of peers. In one embodiment, a lightweight XML parser may be used that supports a subset of XML. This may help reduce the size of the peer-to-peer platform.

There may be areas in a peer-to-peer environment where there is not one correct way to do something or where what should be done depends on the nature and context of the overriding application. For example, in the area of security, every P2P application may choose a different authentication scheme, a different way to ensure communication security, a different encryption algorithm for data security, a different signature scheme for authenticity, and a different access control policy. Therefore, for these areas, the peer-to-peer platform may focus on mechanisms instead of policy, so that application developers can have the maximum freedom to innovate and offer competitive solutions.

Implementations of the peer-to-peer platform may be illustrated with a few application or usage scenarios. For example, assume there is a peer-to-peer community offering a search capability for its members, where one member can post a query and other members can hear and respond to the query. One member is a Napster user and has implemented a feature so that, whenever a query is received seeking an MP3 file, this member will look up the Napster directory and then respond to the query with information returned by the Napster system. Here, a member without any knowledge of Napster may benefit because another member implemented a bridge to connect their peer-to-peer system to Napster. The peer-to-peer platform may provide a platform bridge that may be used to connect the various peer-to-peer systems together.

In another example, one engineering group requires a sizable storage capability, but also with redundancy to protect data from sudden loss. Using the peer-to-peer platform, each group may buy a simple storage system without a mirroring feature, where the disks can then discover each other automatically, form a storage peer group, and offer mirroring facilities using their spare capacity.

As yet another example, many devices such as cell phones, pagers, wireless email devices, Personal Digital Assistants (PDAs), and Personal Computers (PCs) may carry directory and calendar information. Using the peer-to-peer platform, these devices may be able to interact with each other, without extra networking interfaces except those needed by the devices themselves, using the peer-to-peer platform as the common layer of communication and data exchange.

Peers

Network nodes (peers) of various kinds may join the peer-to-peer networking platform by implementing one or more of the platform's protocols. Each peer operates independently and asynchronously of any other peer, providing a degree of reliability and scalability not typically found in current distributed systems. Some peers may have more dependencies with other peers due to special relationships (e.g. gateways or routers). In one embodiment, a peer does not need to understand all of the protocols of the peer-to-peer platform. The peer can still perform at a reduced level if it does not support one or more of the protocols.

Peers may publish and provide network resources (e.g. CPU, storage and routing resources) that may be used by other peers. Peers typically interact with a small number of other peers (network neighbors or buddy peers). Peers that provide the same set of services tend to be inter-changeable. Thus, it may not matter which peers a peer interacts with. Generally, assumptions should not be made about peer reliability or connectivity, as a peer may appear or leave the network at any time. Peers may have persistent storage. A peer may optionally cache information.

Peers may have multiple network interfaces, though a peer may not need to publish all of its interfaces for use with the peer-to-peer protocols. Each published interface may be advertised as a peer endpoint. In one embodiment, a peer endpoint is an identifier (e.g. a URN or URI) that uniquely identifies a peer network interface. Peer endpoints may be used by peers to establish direct point-to-point connection between two peers. Peers may not have direct point-to-point network connection between themselves, either due to lack of physical network connections, or network configuration (NATs, firewalls, proxies, etc.), and thus a peer may have to use one or more intermediary peers to route a message from an endpoint to another peer endpoint.

Peers may be identified by their unique ID (UUID) rather than by a fixed address. When a peer boots, it attempts to contact other peers. In one embodiment, contacted peers may include variable-sized caches that map nearby peers' UUID to their current address. This allows embodiments of the peer-to-peer platform to be run over a dialup connection, for example.

In one embodiment, a peer may be assigned a unique string as a name. Any naming scheme may be used. In one embodiment, names are not unique unless a coordinated naming service is used to guarantee name uniqueness. A naming service is typically a centralized service that guarantees the uniqueness of name and can be used to register name mapping. Examples of naming services are DNS and LDAP. Use of a naming service may be optional.

Peer Groups

Figure 9:
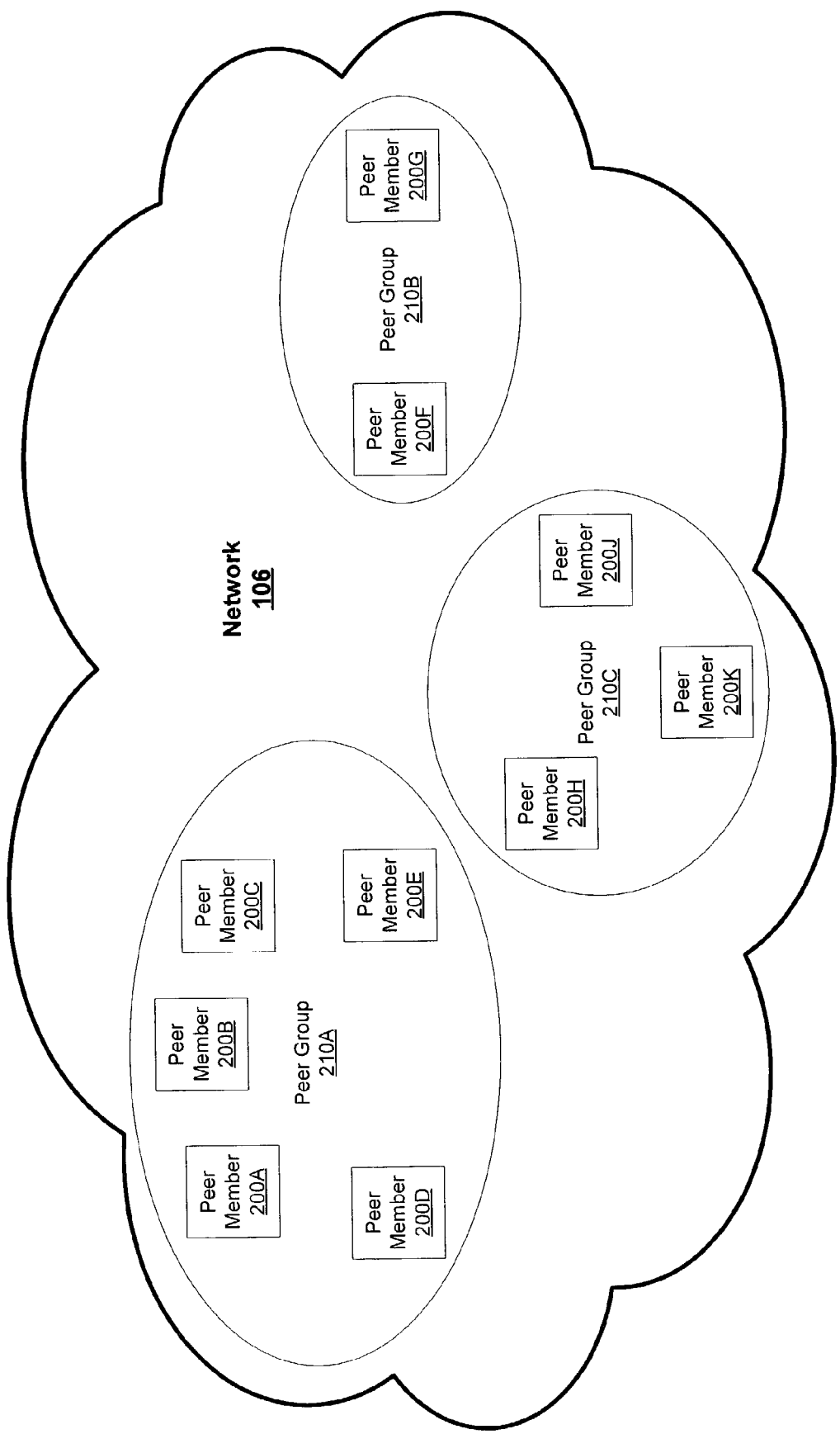
FIG. 9 illustrates an exemplary network with peer groups according to one embodiment.

FIG. 9 illustrates an exemplary network with peer groups according to one embodiment. Network 106 may include, but may not be limited to, the Internet, a corporate intranet, a dynamic proximity network, a home networking environment, LANs, and WANs supporting standards such as IP, Bluetooth, and Havi, among others. The peer groups may divide the network into virtual networks. For example, peer member 200F and peer member 200G are members of the same virtual network provided by peer group 210B. The peer groups may define limited domains of message and service availability thereby providing scope for communications and service access. For example, peer member 200H may broadcast a message over the virtual network provided by peer group 210C. This message may reach peer member 200J and peer member 200K, but may be restricted from reaching (or may be ignored by) peers in peer group 210A and 210B.

The peer-to-peer platform may describe how to create and discover peer groups, but does not dictate when, where, or why to create a peer group, the type of the group, or the membership of the group. A peer group may provide a common membership definition. Each peer group may establish its own membership policy in a range from open (any peer can join) up to highly secure and protected (a peer may join, only if it possesses sufficient credentials).

In one embodiment, peers wishing to join a peer group may first locate a current member, and then request to join the peer group. The peer-to-peer platform may define how to discover peer groups, e.g. using a peer discovery protocol. The application to join may be rejected or accepted by the collective set of current members in accordance with the peer group's membership policy. In one embodiment, a peer group core membership service may be used to enforce a vote among one or more group members. Alternatively, one or more group representative member peers may be elected or appointed to accept or reject new membership applications.

In one embodiment, the peer-to-peer platform is not concerned with what sequence of events a peer or a peer group comes into existence. Moreover, in one embodiment, the peer-to-peer platform does not limit how many groups a peer can belong to. In one embodiment, nested and/or overlapping peer groups may be formed.

Figure 10:
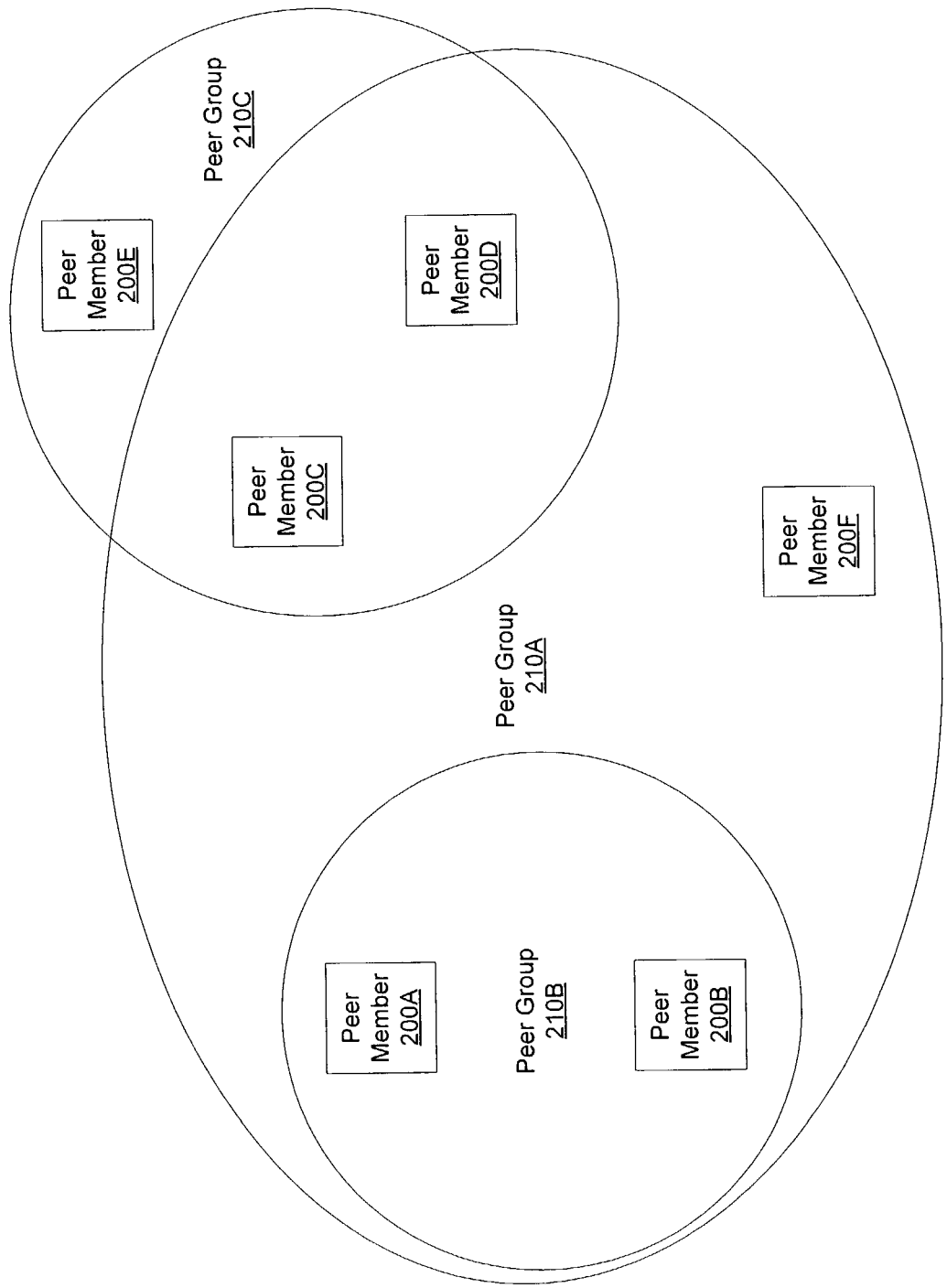
FIG. 10 illustrates nested peer groups and overlapping peer groups according to one embodiment.

FIG. 10 illustrates nested peer groups according to one embodiment. Peer group 210B may be nested within peer group 210A by virtue of all of peer group 210B's members, peer member 200A and peer member 200B, also being members of peer group 210A. Peer member 200A and peer member 200B may access services provided by both peer group 210A and peer group 210B, but peer member 200F may not have access to services provided by peer group 210B.

FIG. 10 further illustrates overlapping peer-groups according one embodiment. Peer group 210A and peer group 210C may overlap by virtue of having peer member 200C and peer member 200D in common. Peer member 200C and peer member 200D may access services provided by peer group 210A and peer group 210C. Peer member 200E may access services provided by peer group 210C, but may not have access to services provided by peer group 210A. Likewise, peer member 200F of peer group 210A may not have access to services provided by peer group 210C.

In one embodiment, there may be a special group, called the World Peer Group, which may include all peer-to-peer platform peers. The world peer group may provide the minimum seed for every peer to potentially find each other and form new groups. In one embodiment, the world peer group has an open membership policy (e.g. has a null membership authenticator service). Some peers inside the world peer group may not be able to discover or communicate with each other—e.g., they may be separated by a network partition. In one embodiment, participation in the World Peer Group is by default.

The peer-to-peer platform may use the concept of a peer group as an implicit scope of all messages originated from within the group. Peer groups may serve to subdivide the network into abstract regions providing an implicit scoping mechanism. Peer groups may provide a limited scoping environment to ensure scalability. Peer groups may be formed and self organized based upon the mutual interest of peers. In one embodiment, no particular rules are imposed on the way peer groups are formed, but peers with the same interests may tend to join the same peer groups.

In one embodiment, a scope may be realized with the formation of a corresponding peer group. Peer group boundaries may define the search scope when searching for a group's content. For example, a peer in San Francisco looking to buy a used car is normally not interested in cars available outside of the Bay Area. In this case, the peer may want to multicast a message to a subset of the current worldwide peer group, and a subgroup may be formed especially for this purpose. In one embodiment, the multicast may be done without the formation of a new peer group. In one embodiment, all messages may carry a special scope field, which may indicate the scope for which the message is intended. Any peer who receives this message may propagate the message based on the scope indicator. Using this approach, a sending peer may be bootstrapped with some well-defined scopes, and additional scopes may be discovered.

Peer groups may also be formed based upon the proximity of the member peers. Proximity-based peer groups may serve to subdivide the network into abstract regions. Regions may serve as a placeholder for general communication and security configurations that deal with existing networking infrastructure, communication scopes and security requirements. Peer groups may provide a scoping mechanism to reduce traffic overload.

Peer groups may provide a secure cooperative environment. Peer group boundaries permit member peers to access and publish protected contents. Peer groups form virtual secure regions which boundaries limit access to the peer group resources. Secure services may be provided to peers within a secured peer group. Their boundaries may or may not reflect any underlying physical network boundaries such as those imposed by routers and firewalls. The concept of a region may virtualize the notion of routers and firewalls, subdividing the network into secure regions in a self-organizing fashion without respect to actual physical network boundaries.

Peer groups may also create a monitoring environment. Peer groups may permit peers to monitor a set of peers for any special purpose (heartbeat, traffic introspection, accountability, etc.). Peer groups may also provide a controlled and self-administered environment. Peer groups may provide a self-organized structure that is self-managed and that may be locally managed.

Peer groups using the peer-to-peer platform may provide several capabilities including, but not limited to, the ability to, find nearby peers, find named peers anywhere on the network, find named peer groups anywhere on the network, join and resign from a peer group, establish pipes between peer group members and find and exchange shared content.

Peers may be grouped into peer groups to share content. A content is published and shared among the peer members of a peer group. In one embodiment, content may be shared among group members, but not between groups. In this embodiment, no single item of content may belong to more than one group. If the same content is published in two different peer groups, two different contents may be created. In one embodiment, a content item may be published to make the item's existence known and available to group members using advertisements. A content may be any computer content (e.g. code, data, applications, active content such as services, or other collection of computer-representable resources). Examples of content include, but are not limited to, a text file, a structured document (e.g. a PDF or a XML file), a Java "jar" or loadable library, code or even an executable process (checkpointed state).

Pipes may provide the primary channels for communication among peers and are a mechanism for establishing communication between peers. Pipes may be used as communication channels for sending and receiving messages between services or applications over peer endpoints. Pipes may connect peers that have a direct physical link and peers that do not have a direct physical link. In the latter case, one or more intermediary peer endpoints may be used to route messages between the two pipe endpoints. A pipe instance is, logically speaking, a resource within a peer group. The actual implementation of a pipe instance is typically through a pipe service. In one embodiment, at each endpoint, software to send, or receive, as well as to manage optional associated pipe message queues is assumed, but not mandated. In one embodiment of the peer-to-peer platform, pipes may be asynchronous, unidirectional, stateless and unreliable to provide the lowest overhead. In one embodiment, enhanced pipes with additional properties such as bi-directionality, reliability, security, and quality of service may be supported.

The pipe endpoints may be referred to as input pipes (receiving end) and output pipes (sending end). Pipes may provide the illusion of a virtual in and out mailbox that is independent of any single peer location. Services and applications may communicate through pipes without knowing on which physical peer a pipe endpoint is bound. Using pipes, developers may build highly available services where pipe connections may be established independently of a peer location. This dynamic binding of pipes helps to provide redundant implementation of services over a P2P network.

Figure 11:
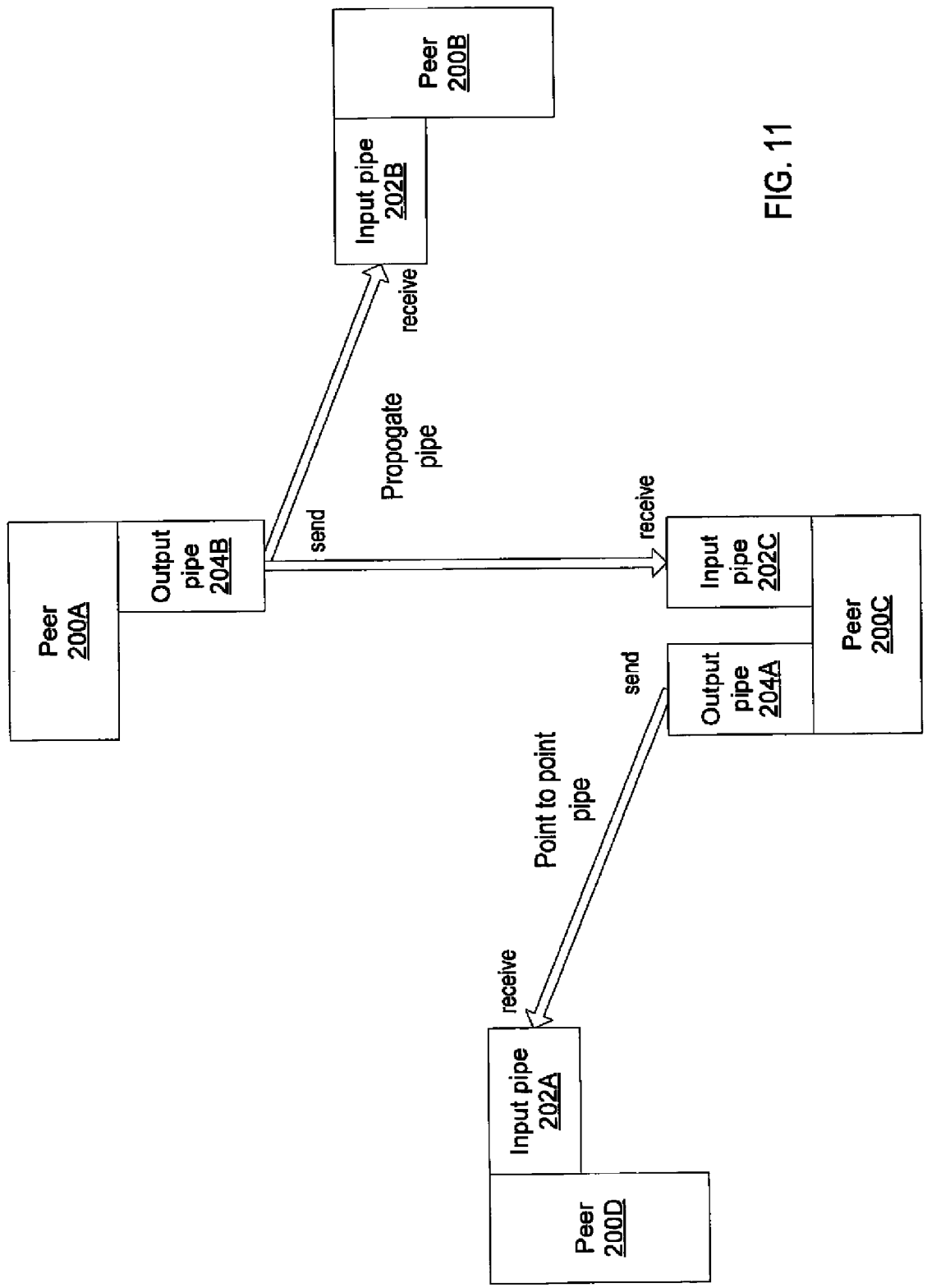
FIG. 11 illustrates a point-to-point pipe connection between peers according to one embodiment.

Pipes may offer several modes of communication. FIG. 11 illustrates a point-to-point pipe connection between peers 200C and 200D according to one embodiment. In one embodiment, a point-to-point pipe connects exactly two peer endpoints together, an input pipe 202A that receives messages sent from an output pipe 204A. The pipe appears as an output pipe to the sender and as an input pipe to the receiver, with traffic going in one direction only—from the sender to the receiver. In one embodiment, no reply or acknowledgement operation is supported. In one embodiment, additional information in the message payload (for example, a unique ID) may be required to thread message sequences. The message payload may also contain a pipe advertisement that can be used to open a pipe to reply to the sender (send/response).

FIG. 11 further illustrates a propagate pipe with peer 200A as a propagation source and peers 200B and 200C with listening input pipes according to one embodiment. A propagate pipe may connect two or more peer endpoints together, from one output pipe 204B to one or more input pipes (e.g. 202B and 202C). The result is that any message sent into the output pipe is sent to all input pipes. Messages flow into the input pipes from the output pipe (propagation source). A propagate message may be sent to all listening input pipes. This process may create multiple copies of the message to be sent. On transports that provide multicast (e.g. TCP/IP), when the propagate scope maps to underlying physical subnets in a one-to-one fashion, transport multicast be may used as an implementation for propagate. Propagate may be implemented using point-to-point communication on transports that do not provide multicast such as HTTP.

Peers may cooperate and communicate to publish, discover and invoke network services. A service denotes a set of functions that a provider offers. In one embodiment, a peer-to-peer platform peer can offer a service by itself or in cooperation with other peers. In one embodiment, a peer may publicize a service by publishing a service advertisement for the service. Other peers may then discover the service using the peer discovery protocol (through the advertisement) and make use of it. A peer may publish as many services as it can provide.

In one embodiment, the peer-to-peer platform may define peer group core services including, but not limited to, a discovery service, a membership service, an access service, a pipe service, a resolver service and a monitoring service. A discovery service may be used to search for peer group resources such as peers, peer groups, and pipes. The search criteria may include a resource name. Discovery and discovery services are described more fully later in this document.

In one embodiment, most peer groups will have at least a membership service. Current peer group members may use the membership service during the login process to reject or accept a new peer group membership application. The membership service may be a "null" authenticator service that imposes no real membership policy. Peers wishing to join a peer group first locate a current member, and then request to join. The application to join may be either rejected or accepted by the collective set of current members. The membership service may enforce a vote of peers or alternatively elect a designated group representative to accept or reject new membership applications.

An access service may be used to validate, distribute, and authenticate a group member's credentials. The access service may define the type of credential used in the message-based protocols used within the peer group. The access service may be used to validate requests made by one peer to another. The peer receiving the request provides the requesting peer's credentials and information about the request being made to the access service to determine if the access is permitted. In one embodiment, not all actions within the peer group need to be checked with the access service, only those actions which only some peers are permitted to use.

A pipe service may be used to manage and create pipe connections between the different peer group members. A resolver service may be used to send query string to peers to find information about a peer, a peer group, a service or a pipe. A monitoring service is used to allow one peer to monitor other members of the same peer group.

In one embodiment, not all the above services are required to be implemented by a peer group. Each service may implement one or more of the peer-to-peer platform protocols. A service may implement one protocol for simplicity and modularity reasons, but some services may not implement any protocols.

In one embodiment, the peer-to-peer platform core services may provide a reference implementation for user-defined services. Examples of user defined services may include, but are not limited to: efficient long-distance peer lookup and rendezvous using a peer naming and discovery service; simple, low-cost information search and indexing using a content sharing service; interoperability with existing centralized networking infrastructure and security authorities in corporate, public, private, or university networks using administration services; a resolver service may be implemented to find active (running on some peer) and inactive (not yet running) service instances; and an FTP service that allows file transfers among peers over pipes using FTP.

Advertisements

In one embodiment, the peer-to-peer protocols may use advertisements to describe and publish the existence of peer resources. An advertisement may be defined as a structured, language neutral metadata structure that names, describes, and publishes the existence of a peer-to-peer platform resource, such as a peer, a peer group, a pipe, or a service. Information exchanged between peers may include advertisement documents. The peer-to-peer platform may include advertisement documents to represent all of the peer-to-peer platform resources managed by the core platform, such as peers, peer groups, pipes and services. In one embodiment, the peer-to-peer platform may define core advertisement types including, but not limited to, one or more of peer advertisements, peer group advertisements, pipe advertisements, service advertisements, content advertisements, and endpoint advertisements. In one embodiment, user-defined advertisement subtypes (for example, using XML schemas) may be formed from these basic types.

Peer-to-Peer Platform Protocols

The peer-to-peer platform protocols may provide and support ad hoc, pervasive, and multi-hop peer-to-peer (P2P) network computing. Using the protocols, peers may cooperate to form self-organized and self-configured peer groups independently of their positions in the network (e.g. edges, firewalls), and without the need of a centralized management infrastructure. The peer-to-peer platform protocols may have very low overhead, make few assumptions about the underlying network transport and limited requirements of the peer environment, and may be used to deploy a wide variety of P2P applications and services in a highly unreliable and changing network environment.

In one embodiment, the peer-to-peer platform may include core protocols including, but not limited to, a peer membership protocol, a peer discovery protocol, a peer resolver protocol, a peer information protocol, a pipe binding protocol, and a peer endpoint protocol. These protocols may be implemented using a common messaging layer. This messaging layer binds the protocols to various network transports. In one embodiment, the peer-to-peer platform protocols may be specified as a set of markup language (e.g. XML) messages exchanged between peers. Each software platform binding describes how a message is converted to and from a native data structures such as a Java object or 'C' structure. In one embodiment, the use of markup language messages to define protocols allows many different kinds of peers to participate in a protocol. Each peer is free to implement the protocol in a manner best suited to its abilities and role. Peer-to-peer platform messages are described previously in this document.

In one embodiment, each of the protocols is independent of the others. A peer may not be required to implement all of the networking protocols. A peer may implement only the protocol that it requires. For example, a device may have all the advertisements it uses pre-stored in memory, so that peer does not need to implement the Peer Discovery Protocol. As another example, a peer may use a pre-configured set of peer routers to route all its messages, hence the peer does not need to implement the Peer Endpoint protocol. Instead, the peer sends messages to the routers to be forwarded. As yet another example, a peer may not need to obtain or wish to provide status information to other peers, hence the peer does not to implement the peer information protocol. The same can be said about all of the other protocols. In one embodiment, a peer may implement only a portion (client-side or server-side only, for example) of a protocol.

Peers may use the peer-to-peer platform protocols to advertise their resources and to discover network resources (services, pipes, etc.) available from other peers. Peers may form and join peer groups to create special relationships. The peer-to-peer platform protocols may allow peers to communicate without needing to understand or manage the potentially complex and dynamic network topologies that are becoming common. Peers may cooperate to route messages allowing for full peer connectivity. The peer-to-peer platform protocols allow peers to dynamically route messages across multiple network hops to any destination in the network (potentially traversing firewalls). Each message may include either a complete or a partial ordered list of gateway peers through which the message might be routed. If route information is incorrect, an intermediate peer may assist in dynamically finding a new route. A peer-to-peer platform protocol message that is routed through multiple hops may not be assumed to be reliably delivered, even if only reliable transports such as TCP/IP are used through all hops. A congested peer may drop messages at any time rather than routing them.

The peer-to-peer platform protocols may be implemented on a variety of networks including, but not limited to, the Internet, corporate intranets, dynamic proximity networks, home networking environments, LANs and WANs. The peer-to-peer platform protocols may allow the peer-to-peer platform to be easily implemented on unidirectional links and asymmetric transports. In particular, many forms of wireless networking do not provide equal capability for devices to send and receive. The peer-to-peer platform permits any unidirectional link to be used when necessary, improving overall performance and network connectivity in the system. Thus, the peer-to-peer platform protocols may be easy to implement on any transport. Implementations on reliable and bidirectional transports such as TCP/IP or HTTP may provide efficient bidirectional communications. Even on bidirectional transports, communication ability between any pair of peers may at times not work equally well in both directions. That is, communications between two peers will in many cases be able to operate bidirectionally, but at times the connection between two peers may be only unidirectional, allowing one peer to successfully send messages to the other while no communication is possible in the reverse direction. The peer-to-peer platform unidirectional and asymmetric transport also plays well in multi-hop network environments where the message latency may be difficult to predict. Furthermore, peers in a P2P network tend to have nondeterministic behaviors and thus may appear or leave the network very frequently.

In one embodiment, the peer-to-peer platform protocols do not require a broadcast or multicast capability of the underlying network transport. Messages intended for receipt by multiple peers (propagation) may be implemented using point-to-point communications. The peer-to-peer platform protocols may not require periodic messages of any kind at any level to be sent within the network, and thus may not require periodic polling, link status sensing, or neighbor detection messages, and may not rely on these functions from any underlying network transport in the network. This entirely on-demand behavior of the protocols and lack of periodic activity may allow the number of overhead messages generated by the peer-to-peer platform to scale all the way down to near or at zero, when all peers are stationary with respect to each other and all routes needed for current communication have already been discovered.

In one embodiment, the peer-to-peer platform protocols are defined as idempotent protocol exchanges. The same messages may be sent/received more than once during the course of a protocol exchange. In one embodiment, no protocol states are required to be maintained at both ends. Due to the unpredictability of P2P networks, assumptions may not be made about the time required for a message to reach a destination peer, and thus the peer-to-peer platform protocols may not impose any timing requirements for message receipt.

The peer-to-peer platform protocols may take advantage of additional optimizations, such as the easy ability to reverse a source route to obtain a route back to the origin of the original route.

Figure 12:
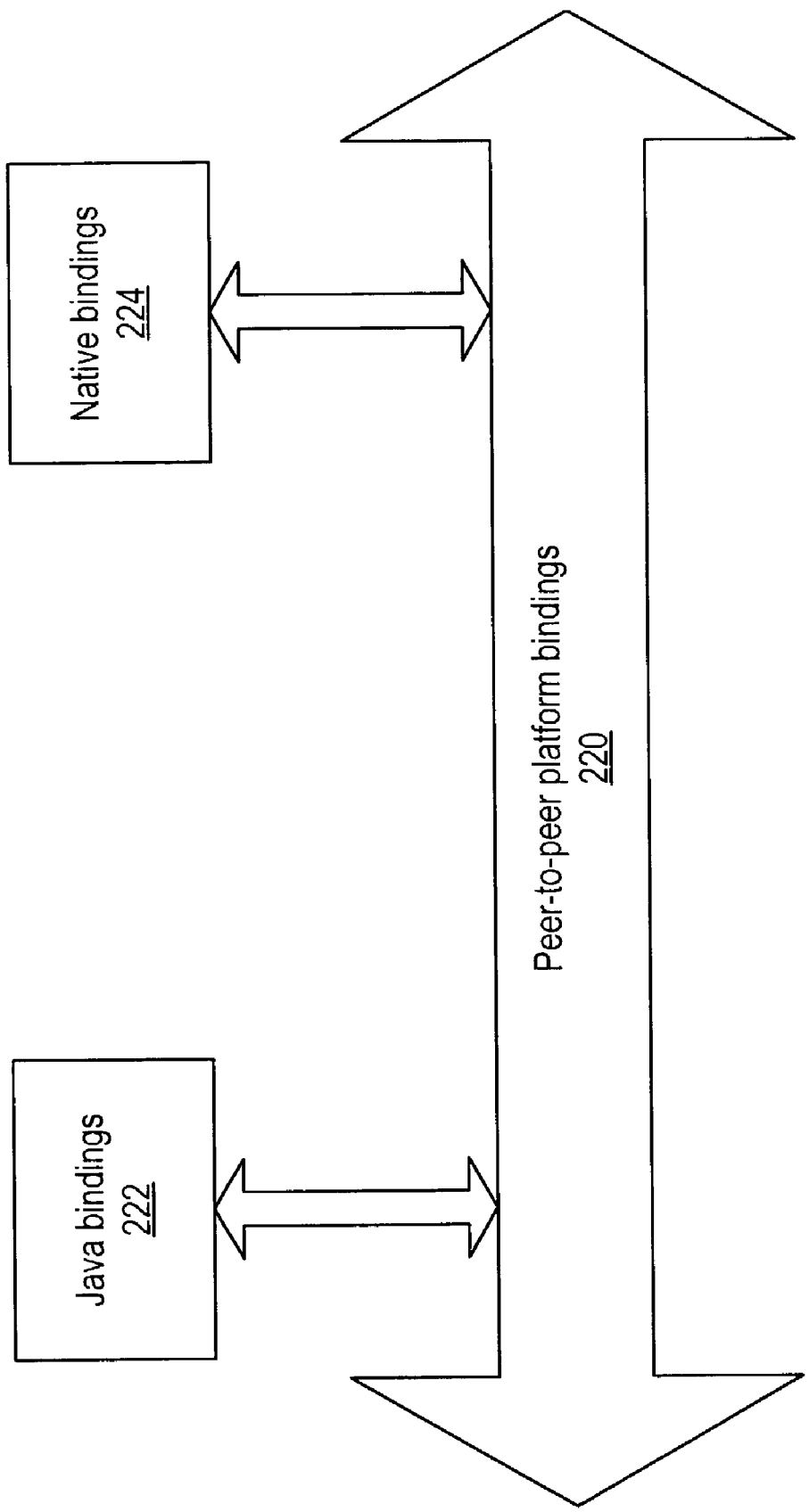
FIG. 12 illustrates protocols and bindings in a peer-to-peer platform according to one embodiment.

FIG. 12 illustrates protocols and bindings in a peer-to-peer platform according to one embodiment. When the peer-to-peer platform protocols are implemented using a particular programming language and over a particular transport protocol, the implementation is an instance of a peer-to-peer platform binding 220, where the peer-to-peer platform protocols are bound to the language and the transport layer. In one embodiment, protocol and peer software implementation issues may be defined in documents specific to the binding. A binding document describes how the protocols are bound to an underlying network transport (such as TCP/IP or UDP/IP) or to a software platform 222 such as Java or a native software platform 224 such as UNIX.

Peer Discovery Protocol

In one embodiment, the peer-to-peer platform may include a peer discovery protocol that may allow a peer to find advertisements on other peers. The peer discovery protocol may be used to discover any published peer resources including other peers, peer groups, pipes, services and any other resource that has an advertisement in the peer-to-peer network. This protocol may be used to find members of any kind of peer group, presumably to request membership. In one embodiment, the peer discovery protocol is the default discovery protocol for all peer groups, including the world peer group. The discovery protocol may be used as a default discovery protocol that allows all peer-to-peer platform peers to understand each other at a very basic level.

The peer discovery protocol may provide, at the lowest level, the minimum building blocks for propagating discovery requests between peers. Thus, the peer discovery protocol may provide the essential discovery infrastructure for building high-level discovery services. In many situations, discovery information is better known by a high-level service, because the service may have a better knowledge of the topology (firewall traversal), and the connectivity between peers. The peer discovery protocol may provide a basic mechanism to discover advertisements while providing hooks so high-level services and applications can participate in the discovery process. Services may be able to give hints to improve discovery (i.e. decide which advertisements are the most valuable to cache).

In one embodiment, the peer discovery protocol may be based on web crawling and the use of rendezvous peers. Rendezvous peers are peers that offer to cache advertisements to help others peers discover resources, and propagate requests they cannot answer to other known rendezvous peers. Rendezvous peers and their use in the discovery process are discussed later in this document.

In one embodiment, custom discovery services may choose to leverage the peer discovery protocol. If a peer group does not have its own discovery service, the peer discovery protocol may be used to probe peers for advertisements. Rendezvous peers may keep a list of known peers and peer groups. This list may or may not be exhaustive or timely. A custom discovery service (if it knew that the region's rendezvous did keep a timely exhaustive list), for example, may discover all peers in the region by sending a single message to the rendezvous peer.

In one embodiment, peer discovery may be done with, or alternatively without, specifying a name for the peer to be located and/or the group to which peers belong. When no name is specified, all discovered advertisements of the requested type may be returned. If a probing peer provides the name of the peer to be located, a simple translation may be requested that returns that peer's advertisement. Once a peer is discovered, ping, status, and capability messages may be sent to its "main" endpoint(s) using a peer information protocol. Peers may export more than one endpoint. Each peer may designate at least one primary endpoint to handle the low-level housekeeping protocols such as the peer discovery protocol and the peer information protocol.

In one embodiment, the peer discovery protocol may be used to probe network peer groups looking for peers that belong to specified peer groups. This process may be referred to as screening. Peers may be screened for membership by presenting each candidate member with a peer group name (string matched with the peer group advertisement canonical name). In one embodiment, peers claiming to belong to this group may respond, while other peers do not respond. The peer discovery protocol may be used to discover any type of core advertisement including, but not limited to: peer advertisements, peer group advertisements, pipe advertisements and service advertisements.

Peer groups may need customizable and adaptable discovery policies. In one embodiment, the peer-to-peer platform may be policy-agnostic, and may only provide the basics for discovery. The basics may include one or more core discovery protocols including, but not limited to, a propagate protocol (broadcast within a scope range (subnet or peer group members)), a rendezvous protocol (unicast to a trusted discovery peer) and an invite protocol (reverse discovering).

A discovery policy may be implemented in a discovery service based on the core discovery protocol. In one embodiment, a discovery service in the core peer-to-peer platform may be used to discover abstractions and/or entities in the peer-to-peer network including, but not limited to, peers, peer groups, peer group policies (group defined services) and pipe endpoints.

In some embodiments of a peer-to-peer platform, the discovery service may rely on trusted peers (discovery proxies). The discovery service may leverage local neighbors (local propagate). The discovery service may use rendezvous peers (indexes). The discovery service may leave traces in discovery proxies (cache). The discovery service may use net crawling as a last resort (propagate between trusted discovery proxies). In one embodiment, a discovery service may not discover some entities in the peer-to-peer network including, but not limited to, content (large scale; in one embodiment, a content management service may be used for content discovery), metadata (maintain relationship between data), users, and applications.

Embodiments of a peer-to-peer platform discovery service may leverage surrounding peers and peer groups, provide meetings points for far away peers and groups, use an asynchronous protocol and provide reverse discovery. The discovery service may be used to find new neighbor peers and provide the ability for a peer to learn about other peer's abilities. Embodiments of a discovery service in the peer-to-peer platform may provide extensibility, spontaneous configuration, adaptive connectivity, a dynamic (i.e. no fixed) network topology, and the ability to reach the "edge of the Internet" (firewall, and NAT).

Embodiments of a discovery method in the peer-to-peer platform may not require centralized naming (e.g. no DNS). A discovery service may provide predefined meeting points that may be used in platform bootstrapping. The discovery service may support a dynamic environment (peers may come and go). The discovery service may support an unreliable environment (peers may fail). The discovery service may help to adapt to a changing environment through viral behavior. The discovery service may be used to improve performance as a system ages (increase locality). The discovery service may be used in support of security (change of physical location). The discovery service may be used that provides administrationless discovery (zero-admin).

Embodiments of the peer-to-peer platform discovery service may allow a peer to learn about other peers that discover it. In one embodiment, the peer-to-peer platform discovery service may provide application-managed rendezvous. In one embodiment of the peer-to-peer platform, a peer discovery protocol may support a discovery query message and a discovery response message to be used in the peer discovery process.

Peer groups need customizable and adaptable discovery policies. One approach to implementing a discovery policy is to start simple and build policies that are more complex. Embodiments of the peer-to-peer platform discovery service may support discovery methods including, but not limited to: Propagate Discovery (unicast to predefined rendezvous; leverage transport dependent multicast (e.g. IP)) and Unicast Discovery (unicast to known rendezvous for forward propagation; may be used for reverse Discovery).

The peer-to-peer platform may not mandate exactly how discovery is done. Discovery may be completely decentralized, completely centralized, or a hybrid of the two. Embodiments of the peer-to-peer platform may support discovery mechanisms including, but not limited to: A LAN-based discovery mechanism may be implemented via a local broadcast over the subset. The discovery mechanism may be by invitation where, if a peer receives an invitation (either in-band or out-of-band), the peer information contained in the invitation may be used to discover a (perhaps remote) peer. The discovery mechanism may be cascaded where, if a peer discovers a second peer, the first peer may, with the permission of the second peer, view the horizon of the second peer to discover new peers, groups, and services. A discovery mechanism may include rendezvous peers. A rendezvous peer is a special peer that keeps information about the peers it knows about. A peer that can communicate via a rendezvous peer, for example via a peer-to-peer protocol pipe, may learn of the existence of other peers. Rendezvous points may be helpful to an isolated peer by quickly seeding it with lots of information. In one embodiment, a web site or its equivalent may provide information of well-known peer-to-peer protocol rendezvous points.

In one embodiment, a peer-to-peer platform web of trust may be used. In a web of trust, a peer group creator may select initial discovery proxies, and may delegate to new peer members. Any peer, when trusted, can become a discovery proxy. Discovery proxies may propagate requests between each other for net-crawling discovery. New peers may be untrusted or low-trust peers, and may be typically difficult to find and have limited discovery range (this may help protect against misbehaviors and denial of service attacks). Trusted members are easier to discover. Peers may increase their discovery range as they become more trusted (discovery credential). Some peers may not need to discover beyond their initial net peer group range.

In one embodiment, a peer may go through a proximity network, which also may be referred to as a subnet or region, to try to find (discover) surrounding peers. The Internet includes the concept of subnets that are physically defined by physical routers that define regions in which computer systems are connected to one another. Within one of these regions, the peer-to-peer protocol uses multicast or other propagate mechanism to find peers. In one embodiment, a propagate discovery mechanism may be provided where one peer can propagate a discovery request through a local subnet. Peers that are in the subnet may respond to the discovery request. The propagate discovery mechanism may provide primarily close range discovery. In one embodiment, only peers that are in the same physical subnet (region) may respond. "Propagate" is at the conceptual level. Multicast is implemented by TCP/IP to provide propagate capabilities. Other transports may use other methods to implement propagate. For example, Bluetooth provides a different implementation of propagate which is not multicast.

The core discovery protocol may provide a format for a local peer to send a propagate message (a request to find information about other peers or peer groups in its local region or subnet) and a format for a response message. A propagate may ask who is there (what peers are in the subnet). One or more peers may decide to respond. Other peers on the subnet may choose not to respond if they do not want to be discovered by the requesting peer. The response message may indicate that a peer is there and that the requesting peer may communicate with it if it wants more information. In one embodiment, the core peer-to-peer platform may define the format of the discovery requests and responses as part of the peer discovery protocol. In one embodiment, the messages may be XML messages.

One embodiment of a peer-to-peer platform may provide a bootstrapping process for peers. In one embodiment, a new peer may not know any peers or peer groups when bootstrapped. When bootstrapping, the peer may issue a peer discovery propagate message. The new peer is looking for one or more peers in the subnet. The new peer needs to reach some level of connectivity in order to support higher-level operations. From discovered peers, the new peer may acquire information needed to allow the new peer to go further in its bootstrapping process. For example, the new peer may send messages to another peer requesting information on services that the other peer may be aware of that the new peer needs for bootstrapping.

When the new peer discovers another peer or peers, it may attempt to discover peer groups. This process may be similar to the peer discovery process described above. The new peer may send (e.g. propagate) another discovery message that is configured to discover peer groups. Peers in the proximity network (region) that are aware of a peer group or peer groups may respond to the peer group discovery message, and may return information on the peer group(s) (e.g. peer group advertisements) of which they are aware. The new peer may use this information to determine a peer group or peer groups that it may be interested in joining.

In one embodiment, a peer group may be configured so that only a subset of peers within a group may have the capabilities to respond to peer group discovery messages and to provide information about the peer group to inquiring peers.

Peer and peer group discovery may both be implemented by the peer discovery protocol. Peer and peer group discover are more or less at the same level in the P2P platform. In one embodiment, peer discovery may use a message that indicates the discovery is looking for peers, and peer group discovery may use a similar message that indicates the discovery is looking for peer groups.

In one embodiment, the peer discovery protocol may be required to be implemented in a peer platform, and thus all peers will have the service running. When one peer sends (e.g. propagates) a request, then a receiving peer must send a response, unless it is configured to not respond to at least some requests from at least some peers based upon configuration parameters. In another embodiment, peers may be implemented without the peer discovery protocol. In other words, in this embodiment, peers are not required to implement the peer discovery platform. For example, on some smart devices, peer information and/or peer group information may be preconfigured into the device, and so bootstrapping may be performed on these devices without having to initiate a peer discovery.

Embodiments of the peer-to-peer platform may implement a discovery mechanism that is more suited for long-range discovery than the propagate method described above. In one embodiment, rendezvous peers may be used in discovery. A rendezvous peer may be described as a meeting point where peers and/or peer groups may register to be discovered, and may also discover other peers and/or peer groups, and retrieve information on discovered peers and/or peer groups. In one embodiment, a peer (any peer) in a peer group may decide to become or may be appointed or elected as a rendezvous peer in the group. The rendezvous peer may be advertised as a meeting point, and may be predefined on peers so that, for example, the peers, when starting up, may know to go to the rendezvous peer to find information about the peer-to-peer network. Rendezvous peers may act as information brokers or centralized discovery points so that peers can find information in an easy and efficient manner. As a peer group grows, a peer may become a rendezvous peer in the group. In one embodiment, a network of rendezvous peers may be constructed that may help to provide long-range discovery capabilities. A rendezvous peer may be aware of at least some of the other rendezvous peers in the network, and a discovery message from a peer may be forwarded from a first rendezvous peer to a second, and so long, to discover peers and/or peer groups that are "distant" on the network from the requesting peer.

Rendezvous peers may offer to cache advertisements to help others peers discover resources, and may propagate (forward) requests they cannot answer to other known rendezvous peers. A rendezvous peer may implement at least one of these two functions. The services provided by a rendezvous peer may be different than message routing. Message routing is performed at a lower level involving multi-hops connections to send a message between any peers in the network. In one embodiment, the forwarding of a request between two rendezvous peers may involve routing to propagate a request between two rendezvous, but this is transparent to the rendezvous service and done underneath.

In one embodiment, rendezvous peers may forward requests between each other. A rendezvous may be typically connected to a few other rendezvous peers. There may be as many rendezvous peers as peers in a peer group. Not every peer may be a rendezvous (e.g. if a peer has no caching capabilities or is isolated behind a firewall). In one embodiment, only rendezvous peers may forward a discovery request to another rendezvous peer. This restriction may serve to limit and control the exponential growth of request propagations within the network. Rendezvous peers may thus provide a simple throttle mechanism to control the propagation of requests. In one embodiment, sophisticated rendezvous peers may be deployed to filter and distribute requests for the best usage of network resources.

In one embodiment, a peer may be pre-configured with a pre-defined set of rendezvous peers. These bootstrapping rendezvous may help the peer discover enough network resources (peers, rendezvous, services) as it needs to support itself. In one embodiment, the pre-configured rendezvous are optional. A peer may be able to bootstrap by finding rendezvous or enough network resources in its proximity environment. If a peer does not know the information, it may ask the surrounding peers (hop of 1) if they know the answer. One or more peers may already have the answer. If no surrounding peers know the answer, the peer may ask its rendezvous peers to find advertisements. Peers are recognized as rendezvous peers in their peer advertisements. When a peer discovers a new peer, it can determine if this peer is a rendezvous. A peer may not be required to use all the rendezvous peers that it has discovered.

Rendezvous peers may forward requests among themselves. The discovery process continues until one rendezvous peer has the answer or the request dies. In one embodiment, there may be a Time To Live (TTL) associated with the request, so that it is not infinitely propagated. As an example, suppose a peer A is attempting to discover a resource R on the network. Peer A issues a discovery request specifying the type (peer, peer group, pipe, service) of advertisements it is looking for. To initiate the Discovery, peer A sends a discovery request message as a single propagate packet to all its available endpoints. The packet may contain the requested peer advertisement, so the receiving peer can respond to the requester. Each discovery request identifies the initiator, and a unique request identification specified by the initiator of the request. When another peer receives the discovery request (assume peer B in this example), if it has the requested R advertisement, it will return to peer A the advertisement for R in a discovery response message. If Peer A does not get response from its surrounding peers (hop of 1), Peer A may send the request to its known rendezvous peers. If the rendezvous peers do not have the advertisement, they can propagate the request to all other rendezvous peers they know. When a rendezvous receives a respond to a request, the rendezvous MAY cache the R advertisement for future usage, before sending it to the requester.

In one embodiment, the peer rendezvous capabilities may be embedded in the core discovery protocol of the peer-to-peer platform. Rendezvous peers may be protocol-based, and may broker more information than name servers that typically only broker names of entities. In one embodiment, a rendezvous peer may maintain indexes for entities in the peer-to-peer platform including peers, peer groups, and advertisements. These indexes are dynamic which are created as the peer group community grows and more peers join. As a group joins, some peers may decide to become rendezvous peers to help peers connect with other peers in the group.

The rendezvous peer is at the peer level. A rendezvous peer is not a "service." A rendezvous peer may be used as part of an infrastructure to construct services such as a DNS or other centralizing and index services. In one embodiment, services may interact with a rendezvous peer to obtain and/or manipulate information stored on the rendezvous peer to perform some task to make the system act more efficiently.

In a network of peers, some peers may elect themselves, through the discovery protocol, to become rendezvous peers. A rendezvous peer may act as a broker or discovery message router to route discovery messages to the right place. In other words, a rendezvous may act to route discovery requests to the right rendezvous peers. For example, a rendezvous peer may receive a message requesting information about peers that are interested in baseball. The rendezvous peer may know of another rendezvous peer that specializes in information about baseball. The first rendezvous peer may forward or route the message to the second rendezvous peer. In one embodiment, rendezvous peers may maintain connections to other rendezvous peers in order to provide discovery and routing functionality.

Rendezvous peers may support long-range discovery. For example, a first peer is at a remote location from a second peer. For one of these peers to find the other with a mechanism such as web crawling may be time consuming, since there maybe a lot of "hops" between the two peers. Rendezvous peers may provide a shortcut for one of the peers to discover the other. The rendezvous peer, thus, may serve to make the discovery process, in particular long-range discover, more efficient.

A peer-to-peer network may be dynamic. Peers and peer groups can come and go. Dynamic identifiers (addresses) may be used. Thus, routes between peers need to be dynamic. Rendezvous peers may provide a method for route discovery between peers that allows routing in the peer-to-peer network to be dynamic. In this method, the rendezvous peers may perform route discovery for peers when the peers send discovery messages to the rendezvous peers or when a peer is attempting to connect to another peer or peer group that is not in the local region of the peer. This method may be transparent to the requesting peer.

In one embodiment, the rendezvous peers may be able to cache advertisements. An advertisement may be defined as metadata or descriptions of a resource. An advertisement may include information necessary for an entity to connect to or use the resource; for example, a service advertisement may include information for connecting to and using the service. Advertisements may be published to allow other entities to discover them. The rendezvous peer may provide the ability for services and applications to store and cache temporary, e.g. via a lease mechanism, advertisements. This may used, for example, when one service needs to connect to another service, and needs the pipe endpoint or communication channel that may be used to connect to the service. The pipe endpoint may be included in a service advertisement published on a rendezvous peer. Thus, in one embodiment, the rendezvous peer provides the ability for peers, peer groups, services and applications to advertise pipe endpoints and to discover pipe endpoints of services and applications. In one embodiment, the rendezvous protocol may use an index cache (e.g. on a peer serving as a rendezvous proxy). In one embodiment, the rendezvous protocol may be used across subnets (configurable at the peer group level). In one embodiment, the rendezvous protocol may be used across/through firewalls (e.g. gateways).

In one embodiment, the peer-to-peer platform may include a propagate policy for use in discovery. In one embodiment, propagation may be controlled using TTL (time to live). In another embodiment, propagation may be controlled using message counts. In one embodiment, the propagate policy may be used for subnet TCP/multicast (platform configurable). In one embodiment, the propagate policy may support HTTP gateways (platform configurable). In one embodiment, the propagate policy may be used through firewalls (e.g. need peer activation behind firewalls).

In one embodiment, the peer-to-peer platform may include an invite policy. In one embodiment, the invite policy may support the adding of new peers and peer groups (e.g. publish advertisements).

In one embodiment, the peer-to-peer platform may allow the persistent local peer caching of discovery information. In this embodiment, a peer may be allowed to cache advertisements discovered via the peer discovery protocol for later usage. Caching may not be required by the peer-to-peer platform, but caching may be a useful optimization. The caching of advertisements by a peer may help avoid performing a new discovery each time the peer is accessing a network resource. In a highly transient environment, performing the discovery may be necessary. In a static environment, caching may be more efficient.

In one embodiment, the peer-to-peer platform may support trusted discovery peers. In one embodiment, the peer-to-peer platform may use discovery credentials. In one embodiment, the peer-to-peer platform may allow credential delegation. In one embodiment, the peer-to-peer platform may support propagate proxies. In one embodiment, a propagate proxy may support TTL/message counts. TTL stands for Time To Live (how long the request lives in the system). In one embodiment, a propagate proxy may support net crawling. In one embodiment, a propagate proxy may provide "smart above" routing.

In one embodiment, a peer may not initiate a new discovery request until the minimum allowable interval between discoveries is reached. This limitation on the maximum rate of discoveries may be similar to the mechanism required by Internet nodes to limit the rate at which ARP requests are sent for any single target IP address. The maximum rate may be defined by each specific implementation transport bindings and exported to the application.

A message or messages may be used to get all known, reachable advertisements within a region on the network. This list may not be exhaustive, and may be empty. Named peers may also be located using the peer discovery protocol. A message may include a peer group credential of the probing (requesting) peer that may identify the probing peer to the message recipient. The destination address may be any peer within a region (a propagate message) or alternatively a rendezvous peer (a unicast message). A response message may return one or more advertisements (e.g. peer advertisements and/or peer group advertisements) that may include "main" endpoint addresses that may be converted to a string in the standard peer endpoint format (e.g. URI or URL) and may include a network transport name. It may not be guaranteed that a response to a query request will be made. The peer discovery protocol may not require a reliable transport. Multiple discovery query requests may be sent. None, one or multiple responses may be received.

In one embodiment, a discovery query message may be used to send a discovery request to find advertisements (e.g. for peers or peer groups). The discovery query may be sent as a query string (attribute, value) form. A null query string may be sent to match any results. A threshold value may be included to indicate the maximum number of matches requested by a peer. In one embodiment, a discovery response message may be used to send a discovery response message to answer a discovery query message.

Reverse Discovery

Reverse discovery means that, in a peer-to-peer network, when a first entity (e.g. a peer) discovers a second entity (e.g. another peer), the second entity may also discover the first entity from the discovery initiated by the first entity. This may also be referred to as "mutual discovery." In most traditional systems, discovery is typically one-directional. In the peer-to-peer world, reverse discovery is important because, by definition, all "peers" are equal (i.e. it is typically not a hierarchical system). In one embodiment, there may be different levels of discovery for peers. For example, a peer may be configured to remain anonymous when discovering other peers or to always support reverse discovery. In one embodiment, a peer initiating a discovery may also be configured to deny discovery to another peer if the other peer is configured or chooses to remain anonymous. In one embodiment, a peer may also be configured to or may choose to deny discovery by other peers that wish to remain anonymous.

Invitations

One embodiment of the discovery protocol may also provide methods by which a peer can "advertise" itself, for example when joining a peer-to-peer network. For example, a peer may send an email message, by telephone, by "traditional" mail, or by other methods to other peers it discovers or is preconfigured to know about to advertise its presence and willingness to be contacted by other peers. This is done outside of the discovery method, and may be performed by any external medium. A peer who receives an invitation from a peer may have a capability to add or enter the new peer to a list or database of peers that it knows about. When the peer later restarts, these peers may be among the preconfigured peers that the peer knows about. In one embodiment, a peer may have a "notify" or "invitation" interface to allow a user to initiate invitations. In one embodiment, the peer-to-peer platform may provide import and export capabilities for invitations. In one embodiment, the invitations may be implemented as documents external to the peer-to-peer system that may be exported from one peer and imported into another peer. In one embodiment, the invitations may be in a format that enables the exporting and importing. In one embodiment, the invitations may be in XML format. In one embodiment, an interface may be provided to allow the manual entering of invitation information. Importing the invitation may create a peer-to-peer platform document that may then be used by the peer. The format of exported documents may depend on the platform on which the peer is implemented.

Peer Resolver Protocol

In one embodiment, the peer-to-peer platform may include a peer resolver protocol that may allow a peer to send simple, generic search queries to one or more peer services. In one embodiment, only those peers that have access to data repositories and that offer advanced search capabilities typically implement this protocol. Each service may register a handler in the peer group resolver service to process resolver query requests. Resolver queries may be demultiplexed to each service. Each service may respond to a peer via a resolver response message. It is important to point the differences between the peer discovery protocol and the peer resolver protocol. The peer discovery protocol is used to search for advertisements to bootstrap a peer, and discover new network resources. The peer resolver protocol is a generic service that services query protocols. The peer resolver protocol may be used by a service on a peer to interact with a service on another peer.

The peer resolver protocol may enable each peer to send and receive generic queries to find or search for peer, peer group, pipe or service specific information such as the state of a service or the state of a pipe endpoint. Each resolver query may have a unique service handler name to specify the receiving service, and a query string to be resolved by the service. The peer resolver protocol may provide a generic mechanism for peers to send queries and receive responses. The peer resolver protocol may remove the burden for registered message handlers by each service and set message tags to ensure uniqueness of tags. The peer resolver protocol may ensure that messages are sent to correct addresses and peer groups. The peer resolver protocol may perform authentication and verification of credentials and the dropping of rogue messages. In one embodiment, there is no guarantee that a response to a resolver query request will be made. In one embodiment, a peer may not be required to respond to a resolver query request. In one embodiment, a reliable transport is not required by the peer resolver protocol. In one embodiment, multiple resolver query messages may be sent. None, one or multiple responses may be received.

In one embodiment, propagating a query to the next set of peers may be delegated to the peer rendezvous protocol. The rendezvous service may be responsible for determining the set of peers that may receive a message being propagated, but may not re-propagate an incoming propagated message. The decision of propagating a message one step further may be left to the service handling the message. The peer rendezvous protocol's policy may be that if the query handler does not instruct the peer rendezvous protocol to discard the query, and if the local peer is a rendezvous, then the query is re-propagated (within the limits of loop and time-to-live rules that may be enforced by the rendezvous service). In addition, if instructed by the query handler, an identical query may be issued with the local peer as the originator.

In one embodiment, a resolver query message may be used to send (unicast) a resolver query request to a service on another member of a peer group. In one embodiment, the resolver query may be sent as a query string to a specific service handler. Each query may include a unique identifier. The query string may be any string that may be interpreted by the targeted service handler. A resolver response message may be sent (unicast) to the requesting peer by the service handler. A resolver response message may be returned in response to a resolver query message.

Peer Information Protocol

Once a peer is located, its capabilities and status may be of interest. In one embodiment, the peer-to-peer platform may include a peer information protocol that may allow a peer to learn about other peers' capabilities and status. For example, a peer can send a ping message to see if another peer is alive. A peer may also query another peer's properties where each property has a name and a value string. A peer may not be required to respond to a peer information protocol request.

In one embodiment, messages may be used to get a list of named control "properties" exported by a peer. A property is a "knob" used to get information or configuration parameters from the peer. All properties may be named (e.g. using a string), and may be "read-only." In one embodiment, higher-level services may offer "read-write" capability to the same information, given proper security credentials. Each property may have a name and a value string. Read-write widgets may allow the string value to be changed, while read-only widgets may not. In one embodiment, the peer information protocol may only provide read access. The destination address is a peer's main endpoint that may have been returned in a discovery response message.

A reliable transport may not be required by the peer information protocol. In one embodiment, multiple peer information messages may be sent. None, one or multiple responses may be received. In one embodiment, a ping message may be sent to a peer to check if the peer is alive and/or to get information about the peer. The ping option may define the response type returned. In one embodiment, a full response (peer advertisement) or a simple acknowledge response (alive and uptime) may be returned. In one embodiment, a peer information response message may be returned in response to a ping message.

Peer Membership Protocol

In one embodiment, the peer-to-peer platform may include a peer membership protocol that may allow a peer to join or leave peer groups, and to manage membership configurations, rights and responsibilities. This protocol may allow a peer to obtain group membership requirements (such as an understanding of the necessary credential for a successful application to join the group), to apply for membership and receive a membership credential along with a full group advertisement, to update an existing membership or application credential, and to cancel a membership or an application credential. In one embodiment, authenticators and/or security credentials may be used to provide the desired level of protection.

In one embodiment, the process of joining a peer group may include obtaining a credential that is used to become a group member. In one embodiment, the process of joining a peer group may include obtaining a "form" listing the set of requirements asked of all group members. In one embodiment, this form may be a structured document (e.g. a peer group advertisement) that lists the peer group membership service.

In one embodiment, the peer membership protocol may define messages including, but not limited to, an apply message, a join message, an acknowledgement (ACK) message, a renew message, and a cancel message. A peer membership protocol apply message may be sent by a potential new group member to the group membership application authenticator. The authenticator's endpoint may be listed in the peer group advertisement of every member. In one embodiment, a successful response from the group's authenticator may include an application credential and a group advertisement that may list, at a minimum, the group's membership service. In one embodiment, the apply message may include, but is not limited to, the current credential of the candidate group member and the peer endpoint for the peer group membership authenticator to respond to with an acknowledgement (ACK) message.

A peer membership protocol join message may be sent by a peer to the peer group membership authenticator to join a group. The peer may pass an application credential (from an apply response ACK message) for authentication purposes. A successful response from the group's authenticator may include a full membership credential and a full group advertisement that lists, at a minimum, the group's membership configurations requested of full members in good standing. The message may include a credential (application credential of the applying peer: see ACK message). This credential may be used as the application form when joining. The message may also include the peer endpoint for the authenticator to respond to with an ACK message.

A peer membership protocol ACK message is an acknowledge message that may be used for both join and apply operations. A peer membership protocol ACK message may be sent back by the membership authenticator to indicate whether or nor the peer was granted application rights to the peer group if the peer is applying, or full membership to the peer group if peer is attempting to join. In one embodiment, an ACK message may also be sent in response to peer membership protocol renew messages and cancel messages. The message may include a credential (an application or membership credential allocated to the peer by the peer group authenticator). The message may also include a more complete peer group advertisement that may provide access to further configurations. In one embodiment, not all configuration protocols are visible until the peer has been granted membership or application rights. Some configurations may need to be protected. In addition, depending on the peer credential, the peer may not have access to all the configurations.

A peer membership protocol renew message may be sent by a peer to renew its credential (membership or application) access to the peer group. An ACK (acknowledgement) message may be returned with a new credential and lease if the new is accepted. The renew message may include, but is not limited to, a credential (a membership or application credential of the peer) and the peer endpoint to which an ACK response message may be sent. A peer membership protocol cancel message may be sent by a peer to cancel the peer's membership or application rights in a peer group. The message may include, but is not limited to, a credential (a membership or application credential of the peer) and the peer endpoint to send an ACK message. In one-embodiment, an ACK to a cancel may include a response status indicating the cancel was accepted.

Pipe Binding Protocol

In one embodiment, the peer-to-peer platform may include a pipe binding protocol that may allow a peer to find the physical location of a pipe endpoint and to bind a pipe advertisement to the pipe endpoint, thus indicating where messages actually go over the pipe. A pipe is conceptually a virtual channel between two pipe endpoints (input and output pipes) and may serve as a virtual link between two or more peer software components (e.g. services or applications).

A pipe may be viewed as an abstract, named message queue that supports a number of abstract operations such as create, open, close, delete, send, and receive. The pipe virtual link (pathway) may be layered upon any number of physical network transport links such as TCP/IP. Each end of the pipe may work to maintain the virtual link and to reestablish it, if necessary, by binding endpoints or finding the pipe's currently bound endpoints.

Actual pipe implementations may differ, but peer-to-peer platform-compliant implementations may use the pipe binding protocol to bind pipes to pipe endpoints. In one embodiment, during the abstract create operation, a local peer binds a pipe endpoint to a pipe transport. In another embodiment, bind may occur during the open operation. Unbind occurs during the close operation. In one embodiment, each peer that "opens" a group pipe may make an endpoint available (binds) to the pipe's transport. In one embodiment, messages may be sent only to one or more endpoints bound to the pipe. Peer members that have not opened the pipe may not receive or send any messages on that pipe. In one embodiment, when some peer software wants to accept incoming pipe messages, the receive operation may remove a single message in the order it was received, not in the order it was sent. In one embodiment, a peek operation may be used as a mechanism to see if any message(s) has arrived in the pipe's queue.

In one embodiment, the pipe binding protocol may define messages including, but not limited to, a query message and a response message. In one embodiment, a pipe binding protocol query message may be sent by a peer pipe endpoint to find a pipe endpoint bound to the same pipe advertisement.

In one embodiment, the requestor may ask that the information not be obtained from a cache. This is to obtain the most up-to-date information from a peer to address stale connection. The Peer field specifies a peer identifier. This peer is the one that should respond to the query. In one embodiment, there is no guarantee that a response to a pipe binding request will be made. A peer may not be required to respond to a binding request. A reliable transport may not be required. In one embodiment, multiple binding query messages may be sent. None, one or multiple responses may be received. In one embodiment, a pipe binding protocol response message may be sent to the requesting peer by each peer bound to the pipe in response to a query message.

Endpoint Routing Protocol

In one embodiment, the peer-to-peer platform may include an endpoint routing protocol. The endpoint routing protocol may be used by peers to send messages to router peers requesting available routes for sending message(s) to destination peers.

A peer-to-peer platform network is typically an ad hoc, multi-hops, and adaptive network by nature. Connections in the network may be transient, and message routing may be nondeterministic. Routes may be unidirectional and change rapidly. Peers may appear and leave frequently. Two communicating peers may not be directly connected to each other. Two communicating peers may need to use router peers to route messages depending on the network topology. For example, the two peers may be on different network transports, or the peers may be separated by a firewall or a NAT (Network Address Translation) router. A peer behind a firewall may send a message directly to a peer outside a firewall. However, a peer outside the firewall cannot establish a connection directly with a peer behind the firewall.

The endpoint routing protocol may define a set of request/query messages that is processed by a routing service to help a peer route messages to its destination. When a peer is asked to send a message to a given peer endpoint address, it may look in its local cache to determine if it has a cached route to this peer. If the peer does not find a route, it may send a route resolver query message to available peer routers requesting route information. A peer may have access to as many peer routers as it can find, or optionally a peer may be pre-configured to access certain routers.

Peer routers provide the low-level infrastructures to route a message between two peers in the network. Any number of peers in a peer group may elect themselves to become peer routers for other peers. Peers routers offer the ability to cache route information, as well as bridging different physical (different transport) or logical (firewall and NAT) networks. A peer may dynamically find a router peer via a qualified discovery search. A peer may find out if a peer it has discovered is a peer router via the peer advertisement properties tag.

When a peer router receives a route query, if it knows the destination (a route to the destination), it may answer the query by returning the route information as an enumeration of hops. The message may be sent to the first router and that router may use the route information to route the message to the destination peer. The route may be ordered from the next hop to the final destination peer. At any point the routing information may be obsoleted, requiring the current router to find a new route.

The peer endpoint may add extra routing information to the messages sent by a peer. When a message goes through a peer, the endpoint of that peer may leave its trace on the message. The trace may be used for loop detection and to discard recurrent messages. The trace may also be used to record new route information by peer routers.

In one embodiment, the endpoint routing protocol may provide the last resort routing for a peer. More intelligent routing may be implemented by more sophisticated routing services in place of the core routing service. High-level routing services may manage and optimize routes more efficiently than the core service. In one embodiment, the hooks necessary for user defined routing services to manipulate and update the route table information (route advertisements) used by the peer router may be provided by the endpoint routing protocol. Thus, complex route analysis and discovery may be performed above the core by high-level routing services, and those routing services may provide intelligent hints to the peer router to route messages.

Router peers may cache route information. Router peers may respond to queries with available route information. Route information may include a list of gateways along the route. In one embodiment, any peer may become a router peer by implementing the endpoint routing protocol.

The time-to-live parameter specifies how long this route is valid. The creator of the route can decide how long this route will be valid. The gateways may be defined as an ordered sequence of peer identifiers that define the route from the source peer to the destination peer. The sequence may not be complete, but at least a first gateway may be sufficient to initially route the messages. The remaining gateway sequence may be optional.

The endpoint routing protocol may provide messages including, but not limited to, a route request message and a route answer message from the router peer. In one embodiment, a peer may send a route request message to a router peer to request route information. Route information may be cached or not cached. In some cases, the route query request message may indicate to bypass the cache content and thus to search dynamically for a route. In one embodiment, it is not guaranteed that a route response will be received after a query is sent. In one embodiment, a router peer may send a route answer message to a peer in response to a route information request.

Routing

A peer-to-peer platform may provide a mechanism or mechanisms for searching and accessing peers, peer groups, content, services and other information in a dynamic topology of peers and peer groups, where peers and peer groups can come and go. In one embodiment, peers and peer groups may come and go potentially with limited or no control and notification. Peers may connect to a peer-to-peer network through various wired and wireless protocols, including "not connected" protocols such as may be used by mobile consumer devices such as pagers and PDAs. Peers may also have to cross boundaries, for example boundaries created by firewalls and NAT (Network Address Translation) routers, to connect to other peers.

In one embodiment, in order to bootstrap the system, and also in order to have a fallback mechanism if an application cannot or does not support one or more of the tasks, the core peer-to-peer protocols may be used in providing a discovery and router mechanism for discovering peers and other core abstractions such as advertisements, pipes, and peer groups. The discovery and routing mechanism of the peer-to-peer platform may use as few protocols as possible, is simple, and makes use of underlying optimizations when available. Hooks into the core discovery and router mechanism may be provided so that applications and services may participate in the discovery and router mechanisms, for example, by passing information to the core discovery and router mechanism. In one embodiment, an application or service may be allowed to override the core discovery and router mechanism with its own custom mechanism.

Figure 13:
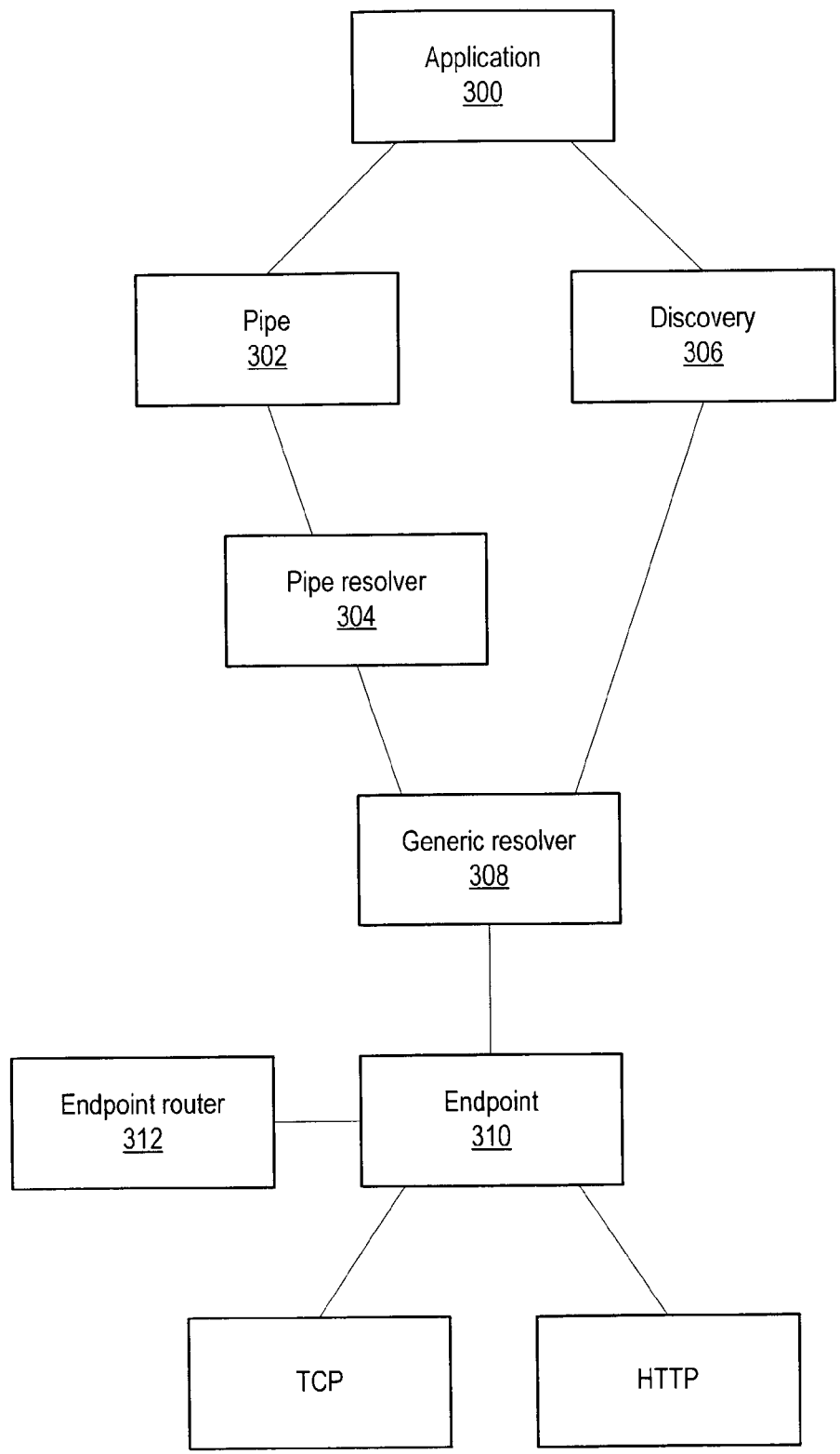
FIG. 13 illustrates several core components and how they interact for discovery and routing according to one embodiment.

FIG. 13 illustrates several core components and how they interact for discovery and routing according to one embodiment. Application 300 may use discovery 308 to find peers, peer groups, advertisements, and other entities on the peer-to-peer network, and may publish pipe, peer, peer group, service, and other advertisements for access by other peers, applications and services on the peer-to-peer network. In one embodiment, the endpoint 310 may be responsible for exchanging messages between peers that are directly "connected" to each other (i.e. the peers can reach each other without any routing and/or discovering). When available, multicast may be used to discover peers that the endpoint can reach (multicast is a mechanism which has been introduced in IP in order to optimize this kind of process). In addition to that, or when multicast is not available, A rendezvous and invitation mechanism may also be provided. The rendezvous and invitation method may be used, for example, if multicast is not available. For example, HTTP does not provide multicast capabilities.

The endpoint router 312 may manage a cache of routes, for example routes to remote peers. In one embodiment, the endpoint router 312 may be configured from caching no routes to caching all routes it is aware of, depending on what the configuration wizard has decided with user control. The endpoint router 312 may also forward (route) messages depending on what is found in the cache, and what has been configured. For instance, the endpoint router 312 may be configured to route search (propagate) requests or to not route the requests.

In one embodiment, the generic resolver 308 is a protocol that implements a sort of RPC (query/response) protocol on top of the endpoint 310. Discovery 306 and pipe resolver 304 may use the generic resolver. In one embodiment, discovery 306 may be responsible for searching, caching and generating core advertisements (e.g. peer, peer group, and pipe advertisements). Discovery 306 may use the generic resolver 308 to send query messages and to receive answers. In one embodiment, discovery 306 may be aware of rendezvous peers and may have an invitation mechanism that may be used to assist the generic resolver 308. In one embodiment, the pipe resolver 304 may be responsible for localizing the receiving end of a pipe 302 given a pipe advertisement. In one embodiment, the pipe resolver 304 does not search for a pipe advertisement. In one embodiment, the pipe resolver 304 may be configured to manage a cache of the locations of the receiving ends (i.e. receiving peers) of the pipe 302.

The pipe protocol may use the endpoint 310 for transferring messages (with the potential help of the endpoint router 312) between the sending end of the pipe 302, and the receiving end of the pipe 302. In one embodiment, a pipe 302 may be viewed as an endpoint 310 that has not been bound to a particular peer. In one embodiment, a pipe 302 may be moved seamlessly from one peer to another. In one embodiment, a pipe 302 may also provides uniqueness that may not be provided by an endpoint 310 since a pipe identifier is unique in time and space, and an endpoint 310, being a network address, may not be.

Security

The security requirements of a P2P system are very similar to any other computer system. The three dominant requirements are confidentiality, integrity, and availability. These translate into specific functionality requirements that include authentication, access control, audit, encryption, secure communication, and non-repudiation. Such requirements are usually satisfied with a suitable security model or architecture, which is commonly expressed in terms of subjects, objects, and actions that subjects can perform on objects. For example, UNIX has a simple security model. Users are subjects. Files are objects. Whether a subject can read, write, or execute an object depends on whether the subject has permission as expressed by the permissions mode specified for the object. However, at lower levels within the system, the security model is expressed with integers, in terms of UID, GID, and the permission mode. Here, the low-level system mechanisms do not (need to) understand the concept of a user and do not (need to) be involved in how a user is authenticated and what UID and GID they are assigned.

In one embodiment, the peer-to-peer platform protocols may be compatible with widely accepted transport layer security mechanisms for message-based architectures such as Secure Sockets Layer (SSL) and Internet Protocol Security (IPSec). However, secure transport protocols such as SSL and IPSec only provide the integrity and confidentiality of message transfer between two communicating peers. In order to provide secure transfer in multi-hops network, a trust association may be established among all the intermediary peers. Security is compromised if anyone of the communication links is not secured.

The peer-to-peer platform security model may be implemented to provide a P2P web of trust. The web of trust may be used to exchange public keys among its members. Each peer group policy may permit some members to be trusted to the extent that they have the authority to sign public keys for other members as well as to do things like authenticate, add new members, and remove or revoke membership.

Embodiments may implement security classes for the RSA public-key exchange, the RC4 byte stream cipher, and the SHA-1 hash algorithm, among others. These classes may enable privacy by the means of a P2P TLS implementation; integrity with signed hashes; non-repudiation using the web of trust; and MACs for data authenticity. Combinations of these classes may form security suites, and the peer-to-peer platform provides the mechanism to add new customized suites as required.

In some embodiments, for peer group authentication a separate Pluggable Authentication Module (PAM) may be provided. Embodiments may provide anonymous or guest login, and login with user name and password. A login session may be in clear or cipher-text as per the peer group security policy.

The security module may be available to the core level, and thus services, applications and advanced services and applications may plug in their own security components and protocols. For example, the web of trust may be defined by a policy that requires authorized peer group members to be well-known certificate authorities, and that peers exchange X509v3 CA signed certificates.

Given that the peer-to-peer platform is defined around the concepts of peers and peer groups, one embodiment may include a security architecture in which peer IDs and group IDs are treated as low-level subjects Oust like UTD and GID), codats are treated as objects Oust like files), and actions are those operations on peers, peer groups, and codats.

The term "codat" as used herein refers to any computer content—code, data, applications, or other collection of computer representable resources. The peer-to-peer protocol may not distinguish among different types of resources that can be stored on a computer and shared among peers in a peer group. Examples of "codat" include text files, photographs, applets, executable files, serialized Java objects, SOAP messages, etc. Codats are the elementary unit of information that is exchanged among peers. In this embodiment, given that codats may have arbitrary forms and properties, it may not be clear what sets of actions should be defined for them. In one embodiment, the codats may carry or include definitions of how they should be accessed. Such codats are analogous to objects, which define for themselves access methods others can invoke.

One or more of several other characteristics of the peer-to-peer platform may further affect the security requirements of the peer-to-peer platform. In one embodiment, the peer-to-peer platform may be focused on mechanisms and not policy. For example, UUIDs are used throughout, but they by themselves have no external meaning. Without additional naming and binding services, UUIDs are just numbers that do not correspond to anything like a user or a principal. Therefore, the peer-to-peer platform may not define a high-level security model such as information flow, Bell-LaPadula, or Chinese Wall. In one embodiment, when UUIDs are bound to external names or entities to form security principals, authenticity of the binding may be ensured by placing in the data field security attributes, for example, digital signatures that testify to the trustworthiness of the binding. Once this binding is established, authentication of the principal, access control based on the principal as well as the prevailing security policy, and other functions such as resource usage accounting may be performed.

The peer-to-peer platform may be neutral to cryptographic schemes and security algorithms. As such, the peer-to-peer platform may not mandate any specific security solution. In such cases, a framework may be provided where different security solutions may be plugged in. In one embodiment, hooks and placeholders may be provided so that different security solutions may be implemented. For example, every message may have a designated credential field that may be used to place security-related information. In one embodiment, exactly how to interpret such information is not defined in the peer-to-peer platform, and may be left to services and applications.

In one embodiment, the peer-to-peer platform may sometimes satisfy security requirements at different levels of the system. To allow maximum flexibility and avoid redundancy, the peer-to-peer platform may not force a particular implementation on developers. Instead, enhanced platforms based on the peer-to-peer platform may provide the appropriate security solutions to their targeted deployment environment. To illustrate the last point, two security concerns (communications security and anonymity) are examined.

Peers communicate through pipes. As an example, suppose both confidentiality and integrity in the communications channel are desired. In one embodiment, Virtual Private Networks (VPNs) may be used to move all network traffic. In one embodiment, a secure version of the pipe may be created, similar to a protected tunnel, such that any message transmitted over this pipe is automatically secured. In one embodiment, regular communications mechanisms may be used, and specific data payloads may be protected with encryption techniques and digital signatures. Embodiments of the peer-to-peer platform may accommodate one or more of these and other possible solutions.

Anonymity does not mean the absence of identity. Indeed, sometimes a certain degree of identification is unavoidable. For example, a cell phone number or a SIM card identification number cannot be kept anonymous, because it is needed by the phone company to authorize and set up calls. As another example, the IP number of a computer cannot be hidden from its nearest gateway or router if the computer wants to send and receive network traffic. In general, anonymity can be built on top of identity, but not vice versa. There may be multiple ways to ensure anonymity. In the examples above, it is difficult to link a prepaid SIM card sold over the retail counter for cash to the actual cell phone user. Likewise, a cooperative gateway or router may help hide the computer's true IP address from the outside world by using message relays or NAT (Network Address Translation).

In one embodiment, a peer-to-peer platform-based naming service may bind a peer to a human user. The user's anonymity may be ensured through the naming service, or the authentication service, or a proxy service, or any combination of these. The peer-to-peer platform may be independent of the solution chosen by a particular application.

At many places, the peer-to-peer platform may be independent of specific security approaches. In one embodiment, the peer-to-peer platform may provide a comprehensive set of security primitives to support the security solutions used by various peer-to-peer platform services and applications. Embodiments of the peer-to-peer platform may provide one or more security primitives including, but not limited to: A simple crypto library supporting hash functions (e.g., MD5), symmetric encryption algorithms (e.g., RC4), and asymmetric crypto algorithms (e.g., Diffie-Hellman and RSA). An authentication framework that is modeled after PAM (Pluggable Authentication Module, first defined for the UNIX platform and later adopted by the Java security architecture). A simple password-based login scheme that, like other authentication modules, can be plugged into the PAM framework. A simple access control mechanism based on peer groups, where a member of a group is automatically granted access to all data offered by another member for sharing, whereas non-members cannot access such data. A transport security mechanism that is modeled after SSL/TLS, with the exception that it is impossible to perform a handshake, a crypto strength negotiation, or a two-way authentication on a single pipe, as a pipe is unidirectional. The demonstration services called InstantP2P and CMS (content management service) also make use of additional security features provided by the underlying Java platform.

In one embodiment, peers, configurations, peer groups, and pipes form the backbone of the peer-to-peer platform. Security in some embodiments of the peer-to-peer platform may use credentials and authenticators (code (e.g. computer-executable instructions) that may be used to receive messages that either request a new credential or request that an existing credential be validated). A credential is a token that when presented in a message body is used to identify a sender and can be used to verify that sender's right to send the message to the specified endpoint and other associated capabilities of the sender. The credential is an opaque token that must be presented each time a message is sent. The sending address placed in the message envelope may be crosschecked with the sender's identity in the credential. In one embodiment, each credential's implementation may be specified as a plug-in configuration, which allows multiple authentication configurations to co-exist on the same network.

In one embodiment, all messages include, at a minimum, a peer group credential that identifies the sender of the message as a full member peer in the peer group in good standing. Membership credentials may be used that define a member's rights, privileges, and role within the peer group. Content access and sharing credentials may also be used that define a member's rights to the content stored within the group.

In one embodiment, the peer-to-peer platform may provide different levels of security. In one embodiment, APIs may be provided to access well known security mechanisms such as RSA. In one embodiment, the peer-to-peer platform may provide a distributed security mechanism in a peer-to-peer environment. In one embodiment, this distributed security may not depend on certificates administered by a central authority. The distributed security mechanism may allow a peer group "web of trust" to be generated. In the distributed security mechanism, peers may serve as certificate authorities (security peers). Each peer group may include one or more peers that may serve as a certificate authority in the group. In one embodiment, the creator of a peer group may become the default security authority in the group. In one embodiment, if there is more than one creator, the creator peers may choose one of the peers to be the security authority in the group. In one embodiment, the peer or peers that create a peer group may define the security methods that are to be used within the group (anywhere from no security to high levels of security). In one embodiment, more than one peer in a peer group may serve as a security peer. Since peers are not guaranteed to be up at all times, having multiple security peers in a peer group may help insure that at least one security peer is available at all times. In one embodiment, the peer group's certificate peer may verify keys to provide a weak level of trust. In one embodiment, peer-to-peer platform advertisements may include information to describe the security mechanism(s) to be used in a peer group. For example, the advertisement may include information to do public key exchange, information to indicate what algorithms are to be used, etc. The advertisement may also include information that may be used to enforce secure information exchange on pipes (e.g. encryption information).

In one embodiment, peer group security may establish a "social contract." The role of security is distributed across peer groups, and across members of peer groups, that all agree to participate by the rules. A peer group may establish the set of rules by which security in the group is enforced. A peer may join the peer group with a low level of security clearance (low trust). If the peer stays in the group and behaves (follows the rules), the peer may build up its level of trust within the group, and may eventually be moved up in its security level. Within peer groups operating under a social contract, certificates and/or public keys may be exchanged without the participation of a strict certificate authority; i.e. the members may exchange certificates based upon their trust in each other. In one embodiment, a peer group may use an outside challenge (e.g. a secret group password) that may be encrypted/decrypted with public/private keys, as a method to protect and verify messages within the group. In one embodiment, peer groups may be configured to use other types of security, including a high level of security, for example using a strict certificate authority, and even no security. In one embodiment, peer-to-peer platform messages exchanged within a group may have a "placeholder" for security credentials. This placeholder may be used for different types of credentials, depending upon the security implementation of the particular group. In one embodiment, all peer-to-peer messages within the group may be required to have the embedded credential. One embodiment may support private secure pipes.

CONCLUSION

Note that the methods as described herein are merely examples. The methods may be implemented in software, hardware, or a combination thereof. The order of methods may be changed, and various elements may be added, reordered, combined, omitted, modified, etc.

Various embodiments may further include receiving, sending or storing instructions and/or data implemented in accordance with the foregoing description upon a computer-accessible medium or article of manufacture. Generally speaking, a computer-accessible medium or article of manufacture may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of nodes configured to couple to a network;
a subset of the plurality of nodes configured to participate as peer nodes in a peer-to-peer environment on the network according to a peer-to-peer platform comprising one or more peer to-peer protocols for enabling the peer nodes to discover each other, to communicate with each other, and to share content in the peer-to-peer environment;
wherein one of the plurality of peer nodes is configured to:
receive an email message formatted according to an email communication protocol;
determine one of the peer nodes as a destination peer node of the email message;
generate a peer-to-peer message formatted in accordance with one of the peer-to-peer protocols by wrapping the email message in a wrapper generated according to the one of the peer-to-peer protocols, wherein the peer-to-peer message comprises the email message and the wrapper; and
send the peer-to-peer message to the destination peer node in accordance with the peer-to-peer protocol, wherein the email message comprises a destination address, and wherein, to determine the one of the plurality of peer nodes as the destination peer node, the one of the plurality of peer nodes is configured to discover the destination peer node according to a peer discovery protocol using the destination address.

2. The system as recited in claim 1, wherein, to send the peer-to-peer message to the destination peer node, the one of the plurality of peer nodes is configured to send the peer-to-peer message to the destination peer node via a pipe in accordance with the peer-to-peer protocol, wherein the pipe represents a virtual communications channel for peer-to-peer communications with one or more of the plurality of peer nodes on the network.

3. The system as recited in claim 1, wherein the destination address is an email address formatted according to the email communication protocol.

4. The system as recited in claim 1, wherein the destination address is a universal unique identifier (UUID) formatted according to the peer-to-peer protocol.

5. The system as recited in claim 1, wherein the destination peer node is configured to:
receive the peer-to-peer message;
obtain the email message from the peer-to-peer message; and
provide the email message to an email client of the destination peer node in accordance with the email communication protocol.

6. The system as recited in claim 1, wherein the one of the plurality of peer nodes is further configured to:
receive a different peer-to-peer message;
generate an email message comprising the different peer-to-peer message; and provide the email message comprising the different peer-to-peer message to an email client of the one of the plurality of peer nodes in accordance with the email communication.

7. The system as recited in claim 6, wherein the one of the plurality of peer nodes is configured to store the email message comprising the different peer-to-peer message to a data store;
wherein the email client is configured to access the one of the plurality of peer nodes to retrieve stored email messages; and
wherein, to provide the email message comprising the different peer-to-peer message to the email client in accordance with the peer-to-peer protocol, the one of the plurality of peer nodes is further configured to send the stored email message comprising the different peer-to-peer message to the email client in accordance with the peer-to-peer protocol in response to said access.

8. The system as recited in claim 6, wherein the one of the plurality of peer nodes is further configured to receive the different peer-to-peer message from another one of the plurality of peer nodes.

9. The system as recited in claim 1, wherein the one of the plurality of peer nodes is further configured to:
receive a peer-to-peer message comprising another email message from another one of the plurality of peer nodes;
extract the other email message from the peer-to-peer message received from the other peer node; and
provide the other email message to an email client of the one of the plurality of peer nodes in accordance with the email communication protocol.

10. The system as recited in claim 9,
wherein the one of the plurality of peer nodes is further configured to store the other email message to a data store;
wherein the email client is configured to access the one of the plurality of peer nodes to retrieve stored email messages; and
wherein, to provide the other email message to an email client of the one of the plurality of peer nodes in accordance with the email communication protocol, the one of the plurality of peer nodes is further configured to send the other email message to the email client of the one of the plurality of peer nodes in accordance with the email communication protocol in response to said access.

11. The system as recited in claim 1,
wherein the one of the plurality of peer nodes is further configured to store the peer-to-peer message to a data store;
wherein the destination peer node is configured to access the one of the plurality of peer nodes to retrieve stored peer-to-peer messages; and
wherein, to send the peer-to-peer message to the destination peer node in accordance with the peer-to-peer protocol, the one of the plurality of peer nodes is further configured to send the stored peer-to-peer message to the destination peer node in accordance with the peer-to-peer protocol in response to said access.

12. The system as recited in claim 1, wherein the one of the plurality of peer nodes is configured to receive the email message from an email client coupled to the peer node via the network.

13. The system as recited in claim 1, wherein the one of the plurality of peer nodes is further configured to send the peer-to-peer message to one or more others of the plurality of peer nodes specified as destination peer nodes of the email message in accordance with the peer-to-peer protocol.

14. A computer system, comprising:
a computer processor;
a network interface for communicating with nodes on a network, wherein a portion of the nodes are configured to participate as peer nodes in a peer-to-peer environment on the network according to a peer-to-peer platform comprising one or more peer-to-peer protocols for enabling the peer nodes to discover each other, to communicate with each other, and to share content in the peer-to-peer environment;
a mail transfer agent implemented by the computer processor and configured to:
receive an email message formatted in accordance with an email communication protocol;
determine one or more peer nodes on the network as destination peer nodes of the email message;
generate a peer-to-peer message formatted in accordance with one of the peer-to-peer protocols by wrapping the received email message in a wrapper generated according to the one of the peer-to-peer protocols, the peer-to-peer message comprising the received email message and the wrapper; and
provide the peer-to-peer message to the one or more destination peer nodes in accordance with the peer-to-peer protocol, wherein the email message comprises one or more destination addresses, and wherein, to determine the one or more peer nodes as the one or more destination peer nodes of the email message, the mail transfer agent is further configured to discover the one or more destination peer nodes according to a peer discovery protocol using the one or more destination addresses.

15. The computer system as recited in claim 14, wherein, to send the peer-to-peer message to the one or more destination peer nodes, the mail transfer agent is further configured to send the peer-to-peer message to the one or more destination peer nodes via one or more pipes in accordance with the peer-to-peer protocol, wherein the one or more pipes represent virtual communications channels for peer-to-peer communication with the one or more destination peer nodes.

16. The computer system as recited in claim 14, wherein the one or more destination addresses include one or more email address formatted according to the email communication protocol.

17. The computer system as recited in claim 14, wherein the one or more destination addresses include one or more universal unique identifiers (UUIDs) formatted according to a peer-to-peer protocol.

18. The computer system as recited in claim 14, further comprising an email client configured to:
generate the email message; and
send the email message to the mail transfer agent in accordance with the email communication protocol.

19. The computer system as recited in claim 14, wherein the mail transfer agent is further configured to receive the email message from another of the nodes on the network in accordance with the email communication protocol.

20. The computer system as recited in claim 14, wherein the mail transfer agent is further configured to:
receive a peer-to-peer message comprising a different email message;
extract the different email message from the peer-to-peer message comprising the different email message; and
provide the different email message to an email client of the system in accordance with the email communication protocol.

21. The computer system as recited in claim 14, wherein the mail transfer agent is further configured to:
  receive a different peer-to-peer message;
  generate an email message comprising the different peer-to-peer message; and
  provide the email message comprising the different peer-to-peer message to an email client of the system in accordance with the email communication protocol.

22. The computer system as recited in claim 14,
  wherein the mail transfer agent is further configured to store the peer-to-peer message to a data store; and
  wherein, to provide the peer-to-peer message to the one or more destination peer nodes in accordance with the peer-to-peer protocol, the mail transfer agent is further configured to send the stored peer-to-peer message to one of the one or more destination peer nodes in accordance with the peer-to-peer protocol in response to the one of the one or more destination peer nodes accessing the mail transfer agent to retrieve stored peer-to-peer messages.

23. The computer system as recited in claim 14, wherein the system is configured to participate as a peer node in the peer-to-peer environment on the network according to the one or more peer-to-peer protocols.

24. A system, comprising:
  a computer processor;
  a network interface for communicating with nodes on a network, wherein a portion of the nodes are configured to participate as peer nodes in a peer-to-peer environment on the network according to one or more peer-to-peer protocols;
  a mail transfer agent implemented by the computer processor and configured to:
    receive a peer-to-peer message formatted in accordance with one of the one or more peer-to-peer protocols;
    generate an email message comprising the peer-to-peer message from the peer node by wrapping the peer-to-peer message in a wrapper generated according to an email communication protocol; and
    provide the email message to an email client of the system in accordance with the email communication protocol.

25. The computer system as recited in claim 24, wherein the mail transfer agent is further configured to receive the peer-to-peer message via a pipe in accordance with the one of the one or more peer-to-peer protocols, wherein the pipe represents a virtual communications channel for peer-to-peer communication with peer nodes in the peer-to-peer environment.

26. The computer system as recited in claim 24, wherein the mail transfer agent is further configured to receive the peer-to-peer message from one of the peer nodes on the network.

27. The computer system as recited in claim 24, wherein the mail transfer agent is further configured to receive the peer-to-peer message from a peer-to-peer service configured to execute within one of the peer nodes on the network.

28. The computer system as recited in claim 24,
  wherein the mail transfer agent is further configured to store the email message to a data store; and
  wherein, to provide the email message to an email client of the system in accordance with an email communication protocol, the mail transfer agent is further configured to send the stored email message to the email client in accordance with the email communication protocol in response to the email client accessing the system to retrieve stored email messages.

29. The computer system as recited in claim 28, wherein the system is configured to participate as a peer node in the peer-to-peer environment on the network.

30. The computer system as recited in claim 28, wherein the portion of the nodes are configured to participate as peer nodes in the peer-to-peer environment according to a peer-to-peer platform comprising the one or more peer-to-peer protocols for enabling the peer nodes to discover each other, to communicate with each other, and to share content in the peer-to-peer environment.

31. A method, comprising:
  a node on a network receiving an email message formatted in accordance with an email communication protocol from an email client;
  the node determining a peer node on the network as a destination peer node of the email message, wherein the peer node is configured to participate with other peer nodes in a peer-to-peer environment on the network according to a peer-to-peer platform comprising one or more peer-to-peer protocols for enabling the peer nodes to discover each other, to communicate with each other, and to share content in the peer-to-peer environment;
  the node wrapping the email message in a peer-to-peer message, wherein the peer-to-peer message is formatted in accordance with one of the peer-to-peer protocols; and
  the node sending the peer-to-peer message comprising the email message to the destination peer node, wherein the peer-to-peer message is formatted in accordance with the one of the peer-to peer protocols, wherein said determining a peer node on the network as a destination peer node of the email message comprises:
  discovering an advertisement on the network using a destination address of the email message; and
  obtaining information indicating the peer node as the destination peer node from the discovered advertisement.

32. The method as recited in claim 31, wherein said sending the peer-to-peer message comprising the email message to the destination peer node comprises sending the peer-to-peer message to the destination peer node via a pipe in accordance with the one of the peer-to-peer protocols, wherein the pipe represents a virtual communications channel for peer-to-peer communications with the destination peer node.

33. The method as recited in claim 31, further comprising:
  the node receiving another peer-to-peer message formatted in accordance with one of the peer-to-peer protocols;
  the node generating another email message comprising the other peer-to-peer message; and
  the node providing the other email message to an email client in accordance with the email communication protocol.

34. The method as recited in claim 33, further comprising:
  the node storing the other email message to a data store; and
  wherein said providing the other email message to an email client in accordance with the email communication protocol is performed in response to the email client accessing the mail transfer agent to retrieve stored email messages.

35. The method as recited in claim 31, further comprising:
  the node receiving another peer-to-peer message comprising another email message;
  the node extracting the other email message from the other peer-to-peer message; and
  the node providing the other email message to an email client in accordance with the email communication protocol.

36. The method as recited in claim 35, further comprising:
the node storing the other email message to a data store; and
wherein said providing the other email message to an email client in accordance with the email communication protocol is performed in response to the email client accessing the mail transfer agent to retrieve stored email messages.

37. The method as recited in claim 31, further comprising:
the node storing the peer-to-peer message to a data store; and
wherein said sending the peer-to-peer message comprising the email message to the peer node is performed in response to the destination peer node accessing the mail transfer agent to retrieve stored peer-to-peer messages.

38. A method, comprising:
a node on a network receiving a peer-to-peer message formatted according to a peer-to-peer protocol;
the node generating an email message formatted according to an email communication protocol by wrapping the peer-to-peer message in a wrapper generated according to the email communication protocol, the email message comprising the peer-to-peer message and the wrapper; and
the node providing the email message to an email client in accordance with the email communication protocol.

39. The method as recited in claim 38, wherein said receiving a peer-to-peer message formatted according to a peer-to-peer protocol comprises receiving the peer-to-peer message via a pipe in accordance with the peer-to-peer protocol, wherein the pipe represents a virtual communications channel for peer-to-peer communication with peer nodes in the peer-to-peer environment.

40. The method as recited in claim 38, wherein said receiving a peer-to-peer message formatted according to a peer-to-peer protocol comprises receiving the peer-to-peer message from a peer node on the network, wherein the peer node is configured to participate with other peer nodes in a peer-to-peer environment on the network according to one or more peer-to-peer protocols.

41. The method as recited in claim 38, wherein said receiving a peer-to-peer message formatted according to a peer-to-peer protocol comprises receiving the peer-to-peer message from a peer-to-peer service executing within a peer node on the network.

42. The method as recited in claim 38, further comprising the node storing the email message to a data store; and
wherein said providing the email message to an email client in accordance with an email communication protocol comprises sending the stored email message to the email client in accordance with the email communication protocol in response to the email client accessing the system to retrieve stored email messages.

43. The method as recited in claim 38, wherein the node is a peer node in the peer-to-peer environment on the network.

44. The method as recited in claim 43, wherein the peer nodes are configured to participate in the peer-to-peer environment according to a peer-to-peer platform comprising the one or more peer-to-peer protocols for enabling the peer nodes to discover each other, to communicate with each other, and to share content in the peer-to-peer environment.

45. A non-transitory computer-readable storage medium, comprising program instructions, wherein the program instructions are configured to implement:
a node on a network receiving an email message formatted in accordance with an email communication protocol from an email client;
the node determining a peer node on the network as a destination peer node of the email message, wherein the peer node is configured to participate with other peer nodes in a peer-to-peer environment on the network according to a peer-to-peer platform comprising one or more peer-to-peer protocols for enabling the peer nodes to discover each other, to communicate with each other, and to share content in the peer-to-peer environment;
the node wrapping the email message in a peer-to-peer message, wherein the peer-to-peer message is formatted in accordance with one of the peer-to-peer protocols; and
the node sending the peer-to-peer message comprising the email message to the destination peer node, wherein the peer-to-peer message is formatted in accordance with the one of the peer-to-peer protocols, wherein, in said determining a peer node on the network as a destination peer node of the email message, the program instructions are further configured to implement:
discovering an advertisement on the network using a destination address of the email message; and
obtaining information indicating the peer node as the destination peer node from the discovered advertisement.

46. The non-transitory computer readable storage medium as recited in claim 45, wherein, in said sending the peer-to-peer message comprising the email message to the destination peer node, the program instructions are further configured to implement sending the peer-to-peer message to the destination peer node via a pipe in accordance with the one of the peer-to-peer protocols, wherein the pipe represents a virtual communications channel for peer-to-peer communications with the destination peer node.

47. The non-transitory computer readable storage medium as recited in claim 45, wherein the program instructions are further configured to implement:
the node receiving another peer-to-peer message formatted in accordance with one of the peer-to-peer protocols;
the node generating another email message comprising the other peer-to-peer message; and
the node providing the other email message to an email client in accordance with the email communication protocol.

48. The non-transitory computer readable storage medium as recited in claim 47, wherein the program instructions are further configured to implement:
the node storing the other email message to a data store; and
wherein said providing the other email message to an email client in accordance with the email communication protocol is performed in response to the email client accessing the mail transfer agent to retrieve stored email messages.

49. The non-transitory computer readable storage medium as recited in claim 45, wherein the program instructions are further configured to implement:
the node receiving another peer-to-peer message comprising another email message;
the node extracting the other email message from the other peer-to-peer message; and
the node providing the other email message to an email client in accordance with the email communication protocol.

50. The non-transitory computer readable storage medium as recited in claim 49, wherein the program instructions are further configured to implement:
the node storing the other email message to a data store; and wherein said providing the other email message to an email client in accordance with the email communication protocol is performed in response to the email client accessing the mail transfer agent to retrieve stored email messages.

51. The non-transitory computer readable storage medium as recited in claim 45, wherein the program instructions are further configured to implement:

the node storing the peer-to-peer message to a data store; and wherein said sending the peer-to-peer message comprising the email message to the peer node is performed in response to the destination peer node accessing the mail transfer agent to retrieve stored peer-to-peer messages.

52. A non-transitory computer readable storage medium, comprising program instructions, wherein the program instructions are configured to implement:

a node on a network receiving a peer-to-peer message formatted according to a peer-to-peer protocol;

the node generating an email message formatted according to an email communication protocol by wrapping the peer-to-peer message in a wrapper generated according to the email communication protocol, the email message comprising the peer-to-peer message and the wrapper; and the node providing the email message to an email client in accordance with the email communication protocol.

53. The non-transitory computer readable storage medium as recited in claim 52, wherein, in said receiving a peer-to-peer message formatted according to a peer-to-peer protocol, the program instructions are further configured to implement receiving the peer-to-peer message via a pipe in accordance with the peer-to-peer protocol, wherein the pipe represents a virtual communications channel for peer-to-peer communication with peer nodes in the peer-to-peer environment.

54. The non-transitory computer readable storage medium as recited in claim 52, wherein, in said receiving a peer-to-peer message formatted according to a peer-to-peer protocol, the program instructions are further configured to implement receiving the peer-to-peer message from a peer node on the network, wherein the peer node is configured to participate with other peer nodes in a peer-to-peer environment on the network according to one or more peer-to-peer protocols.

55. The non-transitory computer readable storage medium as recited in claim 52, wherein, in said receiving a peer-to-peer message formatted according to a peer-to-peer protocol, the program instructions are further configured to implement receiving the peer-to-peer message from a peer-to-peer service executing within a peer node on the network.

56. The non-transitory computer readable storage medium as recited in claim 52, wherein the program instructions are further configured to implement the node storing the email message to a data store; and wherein, in said providing the email message to an email client in accordance with an email communication protocol, the program instructions are further configured to implement sending the stored email message to the email client in accordance with the email communication protocol in response to the email client accessing the system to retrieve stored email messages.

57. The non-transitory computer readable storage medium as recited in claim 52, wherein the node is a peer node in the peer-to-peer environment on the network.

58. The non-transitory computer readable storage medium as recited in claim 57, wherein the peer nodes are configured to participate in the peer-to-peer environment according to a peer-to-peer platform comprising the one or more peer-to-peer protocols for enabling the peer nodes to discover each other, to communicate with each other, and to share content in the peer-to-peer environment.

* * * * *